US012292929B2

(12) United States Patent
Wang et al.

(10) Patent No.: US 12,292,929 B2
(45) Date of Patent: May 6, 2025

(54) GRAPH DATA PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhitao Wang, Shenzhen (CN); Litao Hong, Shenzhen (CN); Weiyi Huang, Shenzhen (CN); Hanjing Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 18/333,530

(22) Filed: Jun. 12, 2023

(65) Prior Publication Data

US 2023/0334096 A1   Oct. 19, 2023

Related U.S. Application Data

(63) Continuation of application No. PCT/CN2022/113580, filed on Aug. 19, 2022.

(30) Foreign Application Priority Data

Sep. 29, 2021  (CN) .......................... 202111151811.8

(51) Int. Cl.
*G06F 16/901*   (2019.01)
(52) U.S. Cl.
CPC .............................. *G06F 16/9024* (2019.01)
(58) Field of Classification Search
None
See application file for complete search history.

(56) References Cited

U.S. PATENT DOCUMENTS

2019/0286655 A1*  9/2019  Leskovec ............ G06F 18/2148
2019/0286659 A1*  9/2019  Leskovec ................. G06N 5/04
(Continued)

FOREIGN PATENT DOCUMENTS

| CN | 111507543 A | 8/2020 |
| CN | 112085172 A | 12/2020 |
| CN | 112541575 A | 3/2021 |

OTHER PUBLICATIONS

The World Intellectual Property Organization (WIPO) International Search Report for PCT/CN2022/113580 Oct. 21, 2022 12 Pages (including translation).

(Continued)

*Primary Examiner* — Eddy Cheung
(74) *Attorney, Agent, or Firm* — ANOVA LAW GROUP, PLLC

(57) ABSTRACT

A graph data processing method includes: based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers.

20 Claims, 6 Drawing Sheets

(56) References Cited

U.S. PATENT DOCUMENTS

2020/0265090 A1    8/2020    Hilloulin et al.
2020/0342523 A1    10/2020    Shah et al.

OTHER PUBLICATIONS

Perozzi, Bryan, Rami Al-Rfou, and Steven Skiena. "Deepwalk: Online learning of social representations." Proceedings of the 20th ACM SIGKDD international conference on Knowledge discovery and data mining . 2014.

Tang, Jian, et al. "Line: Large-scale information network embedding." Proceedings of the 24th international conference on world wide web . 2015.

Grover, Aditya, and Jure Leskovec. "node2vec: Scalable feature learning for networks." Proceedings of the 22nd ACM SIGKDD international conference on Knowledge discovery and data mining. 2016.

Ou, Mingdong, et al. "Asymmetric transitivity preserving graph embedding." Proceedings of the 22nd ACM SIGKDD international conference on Knowledge discovery and data mining . 2016.

Zhou, Chang, et al. "Scalable graph embedding for asymmetric proximity." Proceedings of the AAAI Conference on Artificial Intelligence . vol. 31. No. 1. 2017.

Khosla, Megha, et al. "Node representation learning for directed graphs." Joint European Conference on Machine Learning and Knowledge Discovery in Databases . Springer, Cham, 2019.

Jie Jiang, Lele Yu, Jiawei Jiang, Yuhong Liu and Bin Cui. Angel: a new large-scale machine learning system. National Science Review (NSR), 2017.

Jie Jiang et al. "Angel: a new large-scale machine learning system." National Science Review 5.2 (2018): 216-236.

Mingdong Ou et al. "Asymmetric transitivity preserving graph embedding." Proceedings of the 22nd ACM SIGKDD international conference on Knowledge discovery and data mining. 2016.

Bryan Perozzi et al., "Deepwalk: Online learning of social representations." Proceedings of the 20th ACM SIGKDD international conference on Knowledge discovery and data mining. 2014.

Jian Tang et al. "Line: Large-scale information network embedding." Proceedings of the 24th international conference on world wide web. 2015.

Megha Khosla et al. "Node representation learning for directed graphs." Machine Learning and Knowledge Discovery in Databases: European Conference, ECML PKDD 2019, Würzburg, Germany, Sep. 16-20, 2019, Proceedings, Part I. Springer International Publishing, 2020.

Aditya Grover et al., "node2vec: Scalable feature learning for networks." Proceedings of the 22nd ACM SIGKDD international conference on Knowledge discovery and data mining. 2016.

Chang Zhou et al. "Scalable graph embedding for asymmetric proximity." Proceedings of the AAAI conference on artificial intelligence. vol. 31. No. 1. 2017.

Jiang Jiawei et al., "PSGraph: How Tencent trains extremely large-scale graphs with Spark?", 2020 IEEE 36th International Conference on Data Engineering (ICDE), Apr. 20, 2020.

The European Patent Office (EPO) The Extended European Search Report for Application No. 22874475.1 Nov. 10, 2024 8 Pages.

\* cited by examiner

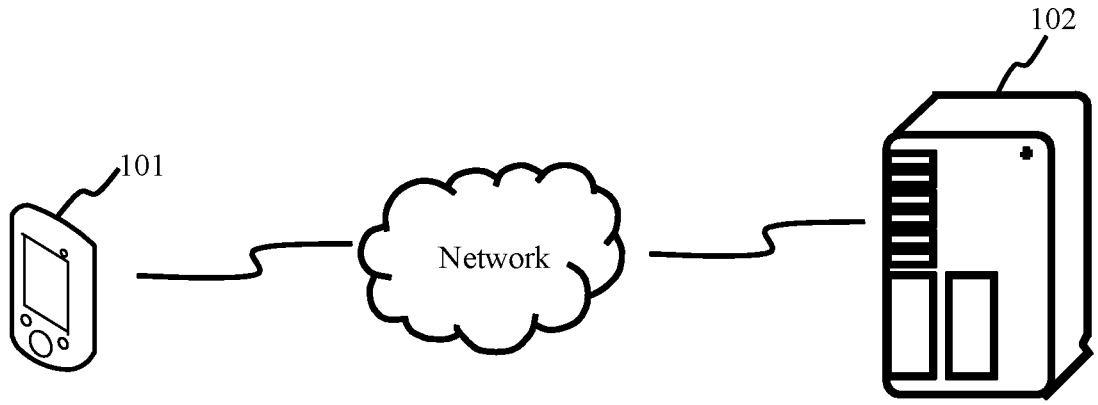

FIG. 1

```
┌─────────────────────────────────────────────────────────────┐
│ Acquire, based on object data, a target graph, the target   │
│ graph including M nodes for representing M objects, M being │
│ a positive integer greater than 1, oriented edges in the    │──── 201
│ target graph being used for representing presence of traffic│
│ relationships between objects corresponding to the connected│
│ nodes, and pointing nodes of the oriented edges being       │
│ initiators of the traffic relationships, and pointed nodes  │
│ of the oriented edges being receivers of the traffic        │
│ relationships                                               │
└─────────────────────────────────────────────────────────────┘
                              │
                              ▼
┌─────────────────────────────────────────────────────────────┐
│ Perform, based on the M nodes and oriented edges between the│
│ M nodes, multiple iterations to obtain initiation embedding │
│ features and reception embedding features corresponding to  │──── 202
│ the M nodes, the initiation embedding features being used   │
│ for representing features of the corresponding nodes as the │
│ initiators, and the reception embedding features being used │
│ for representing features of the corresponding nodes as the │
│ receivers                                                   │
└─────────────────────────────────────────────────────────────┘
```

FIG. 2

GRAPH DATA PROCESSING METHOD AND APPARATUS, COMPUTER DEVICE, AND STORAGE MEDIUM

RELATED APPLICATIONS

This application is a continuation application of PCT Patent Application No. PCT/CN2022/113580, filed on Aug. 19, 2022, which claims priority to Chinese Patent Application No. 202111151811.8, filed on Sep. 29, 2021, content of all of which is incorporated herein by reference in its entirety.

FIELD OF TECHNOLOGY

This application relates to the field of computer technology and, specifically, to a graph data processing method and apparatus, a computer device, a storage medium, and a computer program product.

BACKGROUND

Graph embedding technology has become an effective means for large-scale graph data mining. The main idea of graph embedding is to map sparse high-dimensional original graph data into dense low-dimensional vectors, i.e., embedding vectors of nodes in the graph, so as to preserve the topology information of the graph as much as possible in the embedding space. It is a research direction to find a way to perform graph embedding of graph data efficiently.

Currently, the commonly used graph embedding techniques include DeepWalk, Node2Vec (Node-to-Vector), LINE (Large-scale Information Network Embedding), etc. Based on the random walking algorithm, nodes in the graph data and the traffic relationships between the nodes are determined, and an encoding vector of each of the nodes is determined.

However, with regard to an oriented graph, a pair of nodes in the oriented graph represent an initiator and a receiver of a traffic relationship, separately, and the oriented edge between the pair of nodes points from the initiator to the receiver. However, all the three algorithms mentioned above finally obtain an encoding vector corresponding to each of the nodes in the graph, and it is difficult to fully express the entire data relationship of the nodes in the graph. Therefore, there is a problem of information loss in processing graph data.

SUMMARY

To solve one or more problems set forth above and other problems, the embodiments of this disclosure provide a graph data processing method and apparatus, a computer device, a storage medium, and a computer program product, which enable nodes to fully express information in graph data and ensure information integrity in the process of converting the graph data into a target graph.

One aspect of this disclosure provides a graph data processing method applied to a computer device. The method includes: based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers. A $z^{th}$ iteration, z being a positive integer, of the multiple iterations includes: acquiring N nodes from the M nodes, N being a positive integer equal to or less than M; based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

Another aspect of this disclosure provides a computer device. The computer device includes a memory used for storing at least one computer program containing executable computer instructions, and at least one processor The processor is configured to execute the computer program to perform: based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers. A $z^{th}$ iteration, z being a positive integer, of the multiple iterations includes: acquiring N nodes from the M nodes, N being a positive integer equal to or less than M; based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

Another aspect of this disclosure provides a non-transitory computer-readable storage medium. The non-transitory computer-readable storage medium stores computer program instructions executable by at least one processor to perform: based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers. A $z^{th}$ iteration, z being a positive integer, of the multiple iterations includes: acquiring N nodes from the M nodes, N being a positive integer equal to or less than M; based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

BRIEF DESCRIPTION OF THE DRAWINGS

In order to illustrate the technical solutions in the embodiments of this disclosure more clearly, the following briefly introduces the accompanying drawings for describing the embodiments. Apparently, the accompanying drawings in the following description show only some embodiments of this disclosure, and a person of ordinary skill in the art may derive other drawings from these accompanying drawings without creative efforts.

FIG. 1 is a schematic diagram of an implementation environment of a graph data processing method according to an embodiment of this disclosure.

FIG. 2 is a flowchart of a graph data processing method according to an embodiment of this disclosure.

DESCRIPTION OF EMBODIMENTS

Figure 3:
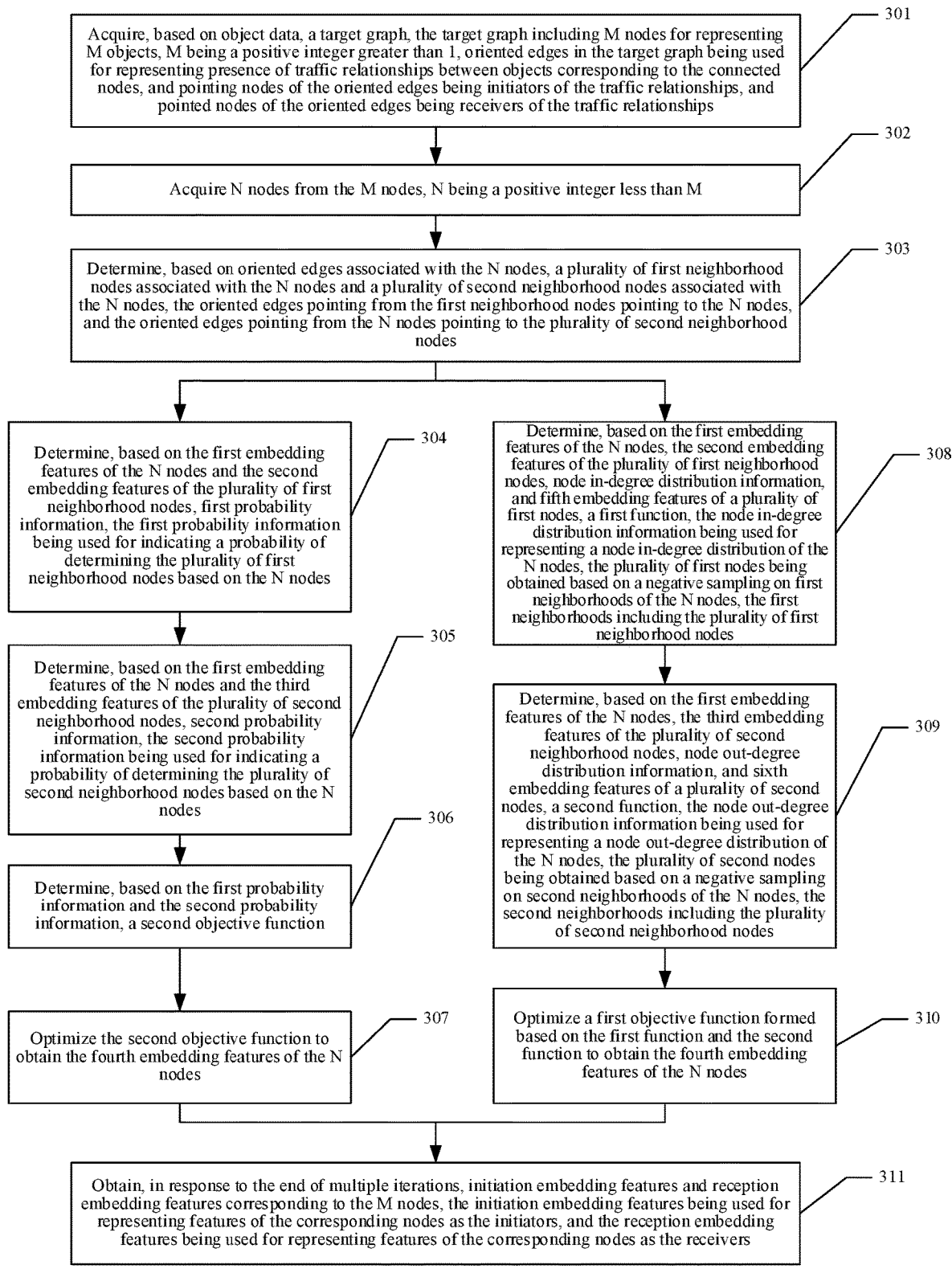
FIG. 3 is a flowchart of another graph data processing method according to an embodiment of this disclosure.

In order to make the objectives, technical solutions, and advantages of this disclosure clearer, certain embodiments of this disclosure will be described below with reference to the accompanying drawings.

In the embodiments of this disclosure, the terms "first", "second", and the like are used to distinguish the same or similar items with substantially the same effects and functions. It is to be understood that the terms "first", "second", and "n*" do not have a logical or chronological dependency, nor do they limit the number or execution order.

The term "at least one" means one or more, and "a plurality of" means two or more.

Hereinafter, technical terms related to the embodiments of this disclosure are explained.

1). A graph, in mathematics, is a structure described for a group of objects in which certain pairs of objects are "related" in a sense. The objects correspond to mathematical abstractions called nodes (also referred to as vertices or points), and each related pair of nodes are connected by an edge (also referred to as a link or a line). In the embodiments of this disclosure, the objects include user accounts, items, virtual resources, positions, virtual live broadcast rooms, and the like, which are not limited by the embodiments of this disclosure. If the objects are user accounts, different nodes in the graph represent different user accounts, and edges in the graph represent traffic relationships between the user accounts, such as transfer and friend request.

2). An oriented graph is a graph formed entirely by oriented edges. A node in the oriented graph has two different identities or roles. For example, if oriented edges pointing from a node 1 and a node 2 point to a node 3, the identity of the node 3 is a receiver (also referred to as a responder or a target role) with respect to the node 1 and the node 2. If oriented edges pointing from the node 3 point to a node 4 and a node 5, the identity of the node 3 is an initiator (also referred to as a sender or a source role) with respect to the node 4 and the node 5.

3). Asymmetry of oriented relationship: the edge relationship of a pair of nodes in an oriented graph is asymmetric. If there is an oriented edge pointing from the node 1 to the node 3 and there is no oriented edge pointing from the node 3 to the node 1 in the oriented graph, the relationship between the node 1 and the node 3 is asymmetric.

4). Graph embedding (also referred to as graph representation learning) is a process of mapping graph data (generally a dense high-dimensional matrix) into dense low-dimensional vectors, which can solve the problem that it is difficult to efficiently input graph data into machine learning algorithms.

5). An edge table, also called an edge set table, is one of the storage structures of graphs. An edge table includes header nodes and table nodes, and each vertex in the graph corresponds to a header node stored in an array.

6). Out-degree: the number of edges pointing from a node is called the out-degree of the node.

7). In-degree: the number of edges pointing to a node is called the in-degree of the node.

The graph data processing method provided by an embodiment of this disclosure is applicable to various scenarios, including but not limited to cloud technology, artificial intelligence, intelligent transportation, and aided driving. The implementation environment of the embodiments of this disclosure is described below.

The graph data processing method provided by the embodiments of this disclosure can be performed by a computer device, which may be a terminal or a server. The implementation environment of the graph data processing method provided by the embodiments of this disclosure will first be described with the computer device being illustrated as a server. FIG. 1 is a schematic diagram of an implementation environment of a graph data processing method according to an embodiment of this disclosure. Referring to FIG. 1, the implementation environment includes a terminal 101 and a server 102.

The terminal 101 and the server 102 can be directly or indirectly connected through wired or wireless communication, which is not limited in the embodiments of this disclosure.

In some embodiments, the terminal 101 may be a smart phone, a tablet computer, a notebook computer, a desktop computer, a smart speaker, a smart watch, a smart home appliance, a vehicle-mounted terminal, etc. An application program is installed and running in the terminal 101. The application program may be a social program, a shopping program, a multimedia program, a game program, etc., which is not limited by the embodiments of this disclosure. In some embodiments, the terminal 101 may be a terminal used by a user, and the terminal 101 runs a social program having a user account for the user to log in. In some embodiments, there may be more or fewer terminal(s) 101 described above. For example, there may be only one terminal 101 described above, or there may be dozens or hundreds of terminals 101 described above. The number and device type of the terminal(s) 101 are not limited in the embodiments of this disclosure.

In some embodiments, the server 102 may be an independent physical server, a server cluster or distributed system formed by a plurality of physical servers, or a cloud server that provides basic cloud computing services, such as cloud services, cloud databases, cloud computing, cloud functions, cloud storage, network services, cloud communication, middleware services, domain name services, security services, CDN (Content Delivery Network), big data, and artificial intelligence platforms. The server 102 is used for providing background services for the above-mentioned application program run by the terminal 101. In some embodiments, the server 102 undertakes the primary computing work, and the terminal 101 undertakes the secondary computing work. Alternatively, the server 102 undertakes the secondary computing work, and the terminal 101 undertakes the primary computing work. Alternatively, the server 102 and the terminal 101 use a distributed computing architecture for collaborative computing.

In the implementation environment, the application program installed in the terminal 101 may be a shopping program.

For example, a user account logs in the shopping program installed in the terminal 101, i.e., a user or customer logs into the user account from the shopping program. The server 102 uses the user account data and item data as object data, and constructs a target graph based on the object data, where nodes in the target graph represent the user account or items, and oriented edges in the target graph represent traffic relationships between the user account and the items. When a customer purchases an item using the user account, an oriented edge between a node 1 representing the user account of the customer and a node 2 representing the item represents a traffic relationship of purchase, where the oriented edge points from the node 1 to the node 2, and the node 1 is an initiator of the purchase, while the node 2 is a receiver of the purchase. Similarly, when a merchant uses a user account to add an item, an oriented edge between a node 3 representing the user account of the merchant and a node 2 representing the item represents a traffic relationship of addition, where the oriented edge points from the node 3 to the node 2, and the node 3 is an initiator of the addition, while the node 2 is a receiver of the addition. The server 102 is capable of acquiring embedding features of nodes in the target graph using the graph data processing method provided in the embodiments of this disclosure. The embedding features are then applied to an item recommendation service, a social recommendation service, an advertising service, etc., which is not limited by the embodiments of this disclosure. For example, in the shopping program, a pointing relationship of an oriented edge can be determined through an inner product calculation on embedding features of two nodes on the oriented edge, so that historical shopping information about a user account can be determined based on pointing relationships of a plurality of oriented edges, enabling item recommendation based on the historical shopping information, and improving recommendation accuracy.

In another embodiment, the computer device may be a terminal with a multimedia program installed thereon.

For example, after being authorized by a user, the terminal acquires historical data of songs listened by the user, including singer names, song names, song types, and the like. The terminal constructs a target graph using the historical data as object data, where nodes in the target graph represent the singer names, the song names, the song types, and the like, and oriented edges in the target graph represent traffic relationships between the objects. When a singer sings a song and the song belongs to a type, an oriented edge between a node A representing the singer and a node B representing the song points from the node A to the node B, and an oriented edge between the node B representing the song and a node C representing the type points from the node B to the node C. The terminal 101 is capable of acquiring embedding features of nodes in the target graph using the graph data processing method provided in the embodiments of this disclosure. The embedding features are then applied to an item recommendation service, a social recommendation service, an advertising service, etc., which is not limited by the embodiments of this disclosure.

In another embodiment, the computer device may be a terminal with a Social Networking Services (SNS) APP installed thereon.

For example, after being authorized by a user, the terminal acquires the user's historical interaction data, including other user identifiers that are forwarded, commented, or liked. The terminal constructs a target graph using the historical interaction data as object data, where nodes in the target graph represent different users in the SNS, and oriented edges represent social relationships. For example, when a user 1 likes a user 2, an oriented edge between the user 1 and the user 2 points from a node A representing the user 1 to a node B representing the user 2. The terminal 101 is capable of determining embedding features of nodes in the target graph using the graph data processing method provided in the embodiments of this disclosure, and then similarities between different users can be determined by using the embedding features of different nodes. Thus, it is possible to predict potential friends of a user based on the similarities between the different users and make recommendations, and to improve recommendation accuracy.

FIG. 2 is a flowchart of a graph data processing method according to an embodiment of this disclosure, which is illustrated as being performed by a server. The graph data processing method includes the following.

201: Acquire, based on object data, a target graph. The target graph includes M nodes for representing M objects, M being a positive integer greater than 1, oriented edges in the target graph being used for representing presence of traffic relationships between objects corresponding to the connected nodes, and pointing nodes of the oriented edges being initiators of the traffic relationships, and pointed nodes of the oriented edges being receivers of the traffic relationships.

In the embodiments of this disclosure, the objects in the object data include user accounts, items, multimedia resources, virtual resources, virtual services, virtual live broadcast rooms, and the like, and the object data includes relationship information between the objects, including traffic relationships and association relationships between the objects. Based on different object data, the server may construct different target graphs, such as social relationship graphs, shopping graphs, and virtual live broadcast graphs. The object data is data collected and used after being fully authorized. Oriented edges in a target graph can represent traffic relationships between objects. When objects corresponding to two nodes connected by an oriented edge are two user accounts, the traffic relationship represented by the oriented edge may be a transfer relationship, a following relationship, a like relationship, etc. For any oriented edge, a node from which the oriented edge points is an initiator of a traffic relationship represented by the oriented edge; and a node to which the oriented edge points is a receiver of the traffic relationship represented by the oriented edge.

In the embodiments of this disclosure, each object corresponds to a node.

202: Perform, based on the M nodes and oriented edges between the M nodes, multiple iterations to obtain initiation embedding features and reception embedding features corresponding to the M nodes. The initiation embedding features are used for representing features of the corresponding nodes as the initiators, and the reception embedding features are used for representing features of the corresponding nodes as the receivers.

In the embodiments of this disclosure, the server can determine, based on multiple iterations, an initiation embedding feature of each node of the M nodes as an initiator and a reception embedding feature of each node as a receiver. In each iteration, for any node, the server can acquire, based on the oriented edges between the nodes, a first neighborhood node taking the node as a receiver and a second neighborhood node taking the node as an initiator, and then gradually determine the initiation embedding feature and the reception embedding feature of the node in a gradient descent manner.

A $z^{th}$ iteration is taken as an example, where z is a positive integer. The $z^{th}$ iteration includes the following processes. The server acquires N nodes from the M nodes described above, N being a positive integer. The server determines, based on oriented edges associated with the N nodes, a plurality of first neighborhood nodes associated with the N nodes and a plurality of second neighborhood nodes associated with the N nodes. The oriented edges pointing from the first neighborhood node point to the N nodes, and the oriented edges pointing from the N nodes point to the plurality of second neighborhood nodes. The server determines, based on first embedding features of the N nodes above, second embedding features of the plurality of first neighborhood nodes, and third embedding features of the plurality of second neighborhood nodes, fourth embedding features of the N nodes, and completes the iteration. The fourth embedding features of the N nodes represent the updated initiation embedding features and reception embedding features of the N nodes after the $z^{th}$ iteration.

The first embedding features of the N nodes above, the second embedding features of the plurality of first neighborhood nodes, and the third embedding features of the plurality of second neighborhood nodes are obtained by the server performing a $(z-1)^{th}$ iteration, the first embedding features of the N nodes representing the updated initiation embedding features and reception embedding features of the N nodes obtained after the $(z-1)^{th}$ iteration.

The embodiments of this disclosure provides a graph data processing method, including: acquiring N nodes from a target graph in each iteration; and then determining, based on first embedding features of the N nodes, second embedding features of a plurality of first neighborhood nodes associated with the N nodes, and third embedding features of a plurality of second neighborhood nodes associated with the N nodes, fourth embedding features of the N nodes, so as to complete an iteration and update the embedding features of the N nodes. Since not all M nodes in the target graph are processed, the calculation amount can be greatly reduced. After multiple iterations, initiation embedding features of the M nodes as initiators as well as reception embedding features of the M nodes as receivers can be obtained, so that the embedding features of the nodes may retain information about the first neighborhoods and the second neighborhoods to a maximum extent, which enables the nodes to fully express information in graph data and eliminates information loss in the process of data conversion. Furthermore, the pointing relationship of an oriented edge can be determined based on the inner product between embedding features of two nodes connected by the oriented edge, so that both the dual identity of a node and the pointing relationship of an oriented edge can be expressed.

FIG. 2 shows an implementation flow of a graph data processing method provided by an embodiment of this disclosure, and the graph data processing method will be described based on an application scenario. FIG. 3 is a flowchart of another graph data processing method according to an embodiment of this disclosure, which is illustrated as being performed by a server and applied to a social scenario. The graph data processing method includes the followings.

301: Acquire, based on object data, a target graph. The target graph includes M nodes for representing M objects, M being a positive integer greater than 1, oriented edges in the target graph being used for representing presence of traffic relationships between objects corresponding to the connected nodes, and pointing nodes of the oriented edges being initiators of the traffic relationships, and pointed nodes of the oriented edges being receivers of the traffic relationships.

In the embodiments of this disclosure, the object data includes object information used for representing attributes of the objects and relationship information used for representing traffic relationships between the objects. When the object data is user account data, the user account data includes user account information and account relationship information. The user account information includes attributes of the user account, such as a user account identifier and a user account level. The account relationship information includes traffic relationships between the user account and other user accounts, and the like, and the contents included in the object data is not limited herein.

In the embodiments of this disclosure, the server can construct, based on the object data above, a target graph including M nodes and oriented edges between the M nodes. The M nodes represent M different user accounts included in the object data, and M is a positive integer greater than 1. In the M nodes, an oriented edge between any two of the nodes is used for representing presence of a traffic relationship between the user accounts corresponding to the two nodes, such as a friend relationship, a group relationship, a collection relationship, and a transfer relationship. For any oriented edge, a node from which the oriented edge points is an initiator of a traffic relationship represented by the oriented edge, and a node to which the oriented edge points is a receiver of the traffic relationship represented by the oriented edge.

Figure 4:
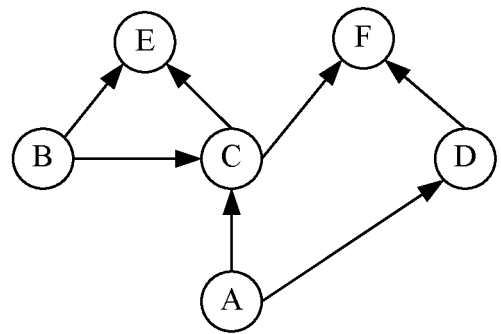
FIG. 4 is a schematic diagram of an oriented graph according to an embodiment of this disclosure.

For example, FIG. 4 is a schematic diagram of an oriented graph according to an embodiment of this disclosure. Referring to FIG. 4, the oriented graph illustratively shows six nodes A, B, C, D, E, and F that represent user accounts. With the node C as an example, two oriented edges point from the node C, and two oriented edges point to the node C. The node C acts as a receiver of traffic relationships with respect to the node A and the node B, and may also be referred to as a target role. The node C acts as an initiator of traffic relationships with respect to the node E and the node F, and may also be referred to as a source role. If the user accounts represented by the node A and the node B initiate transfer traffics to the user account represented by the node C, separately, the node A and the node B are initiators of the transfer traffics, and the node C is a receiver of the transfer traffics. If a group created by the user account represented by the node C includes the user account represented by the node E, the node C is an initiator of the group traffic, and the node E is a receiver of the group traffic. If the user account represented by the node C collects contents posted by the user account represented by the node F, the node C is an initiator of the collection traffic, and the node F is a receiver of the collection traffic.

In some embodiments, the server may further send the object data above to a graph creation server which then creates a target graph based on the object data above. Of course, the server may also acquire, from a local database, the target graph that has been created based on the object data above. The source of the target graph is not limited in the embodiments of this disclosure.

In the embodiments of this disclosure, the server can perform, based on the M nodes and oriented edges between the M nodes, multiple iterations to determine a feature of each node as an initiator of a traffic relationship and a feature of each node as a receiver of a traffic relationship. In each iteration, the server can separately process the M nodes, and can also separately process some of the M nodes based on a plurality of actuators in a distributed processing manner so as to improve the processing efficiency.

In some embodiments, the server can partition the target graph into at least one graph partition, each graph partition including a plurality of nodes and oriented edges between the plurality of nodes. For any graph partition, the server stores nodes in the graph partition into a parameter server, and stores an edge table corresponding to the graph partition into an actuator corresponding to the graph partition. By partitioning the target graph into graph partitions, the nodes are stored in the parameter server in a distributed manner, so that the server can implement distributed computing based on a plurality of actuators, which significantly improves the efficiency of computing graph embedding.

A plurality of actuators are provided in the server which are capable of synchronously performing graph data processing tasks. With any actuator as an example, the actuator can determine embedding features of nodes in the graph partition using a small batch stochastic gradient descent method, and the actuator can acquire N nodes from the corresponding graph partition in each iteration, N being a positive integer.

The $z^{th}$ iteration of any actuator is described as an example below, where z is a positive integer. Steps 302-307 below illustratively show one implementation of the $z^{th}$ iteration, and steps 302, 303, and 308-310 below illustratively show another implementation of the $z^{th}$ iteration.

302: Acquire N nodes from the M nodes, N being a positive integer equal to or less than M.

In the embodiments of this disclosure, the server can sample the M nodes above to obtain N nodes, where the N nodes are those to be processed in the $z^{th}$ iteration.

In some embodiments, each actuator acquires N nodes for processing. For any actuator, the server uses, based on the edge table stored in the actuator, an Alias Table method to sample the target graph to obtain a plurality of sampled edges, where the plurality of sampled edges may be randomly sampled from the target graph, or sampled according to some rule. For example, a node can be sampled every pre-set number of nodes. The nodes connected by the plurality of sampled edges are the N nodes above. The server can determine, based on the plurality of sampled edges, N node identifiers, and then acquire N nodes corresponding to the N node identifiers from the parameter server. Of course, the server may also determine the sampled edges in other ways, or directly sample the nodes, which is not limited by the embodiments of this disclosure.

303: Determine, based on oriented edges associated with the N nodes, a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes.

In the embodiments of this disclosure, for any node, the server can model a neighborhood of the node which is partitioned into a first neighborhood and a second neighborhood based on a dual identity of the node. Then at least one first neighborhood node associated with the node is acquired from the first neighborhood, and at least one second neighborhood node associated with the node is acquired from the second neighborhood. An oriented edge between a first neighborhood node in the first neighborhood and the node points to the node. An oriented edge between a second neighborhood node in the second neighborhood and the node points from the node. Based on distances between nodes, the neighborhood of a node is partitioned into order 1 to order R (also referred to as 1-hop neighbor to R-hop neighbor), where R is a positive integer. The first neighborhood may also be referred to as a source neighborhood and the second neighborhood may also be referred to as a target neighborhood.

For example, with a traffic relationship being exemplified as a transfer relationship, for any node, user accounts represented by the at least one first neighborhood node associated with the node all make transfers to the user account represented by the node. User accounts represented by the at least one second neighborhood node associated with the node all receive transfers from the user account represented by the node.

For any node $v_n$, the expressions of the first neighborhood and the second neighborhood within the order R of the node are shown in Formula (1) and Formula (2):

$$N_s(v_n)=N_s^1(v_n)\cup N_s^2(v_n)\ldots\cup N_s^R(v_n) \quad (1);$$

where $N_s(v_n)$ represents the first neighborhood within the order R of the node $v_n$; $N_s^1(v_n)$ represents a first-order first neighborhood of the node $v_n$; $N_s^2(v_n)$ represents a second-order first neighborhood of the node $v_n$; and $N_s^R(v_n)$ represents an R-order first neighborhood of the node $v_n$, and R is a positive integer.

$$N_t(v_n)=N_t^1(v_n)\cup N_t^2(v_n)\ldots\cup N_t^R(v_n) \quad (2)$$

where $N_t(v_n)$ represents the second neighborhood within the order R of the node $v_n$; $N_t^1(v_n)$ represents a first-order second neighborhood of the node $v_n$; $N_t^2(v_n)$ represents a second-order second neighborhood of the node $v_n$; $N_t^R(v_n)$ represents an R-order second neighborhood of the node $v_n$, and R is a positive integer.

Figure 5:
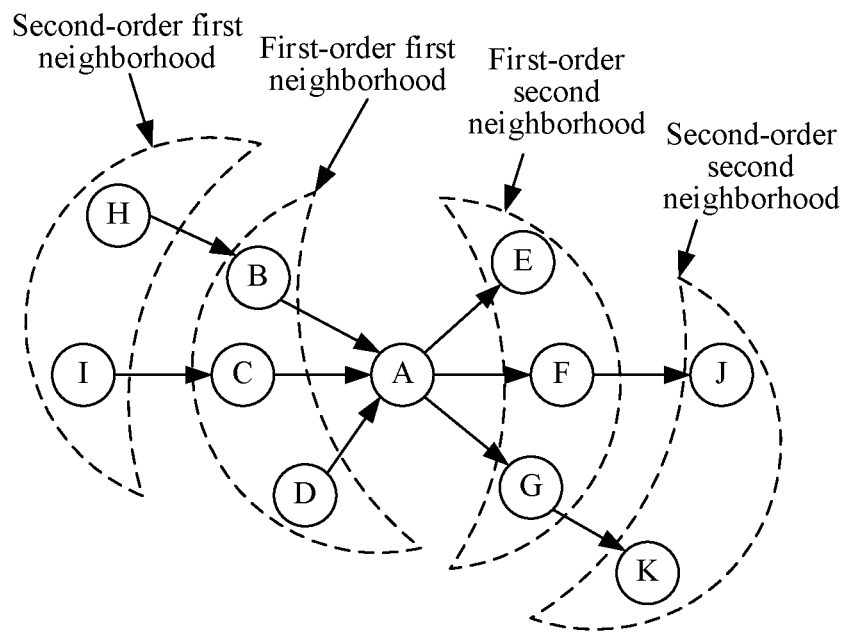
FIG. 5 is a schematic diagram of neighborhood definition for an oriented graph according to an embodiment of this disclosure.

For example, FIG. 5 is a schematic diagram of neighborhood definition for an oriented graph according to an embodiment of this disclosure. Referring to FIG. 5, a first-order first neighborhood of a node A includes a node B, a node C, and a node D, and a second-order first neighborhood of the node A includes a node H and a node I. A first-order second neighborhood of the node A includes a node E, a node F, and a node G, and a second-order second neighborhood of the node A includes a node J and a node K. An oriented edge between any node in the first-order first neighborhood and the node A points to the node A, and an oriented edge connected to any node in the second-order first neighborhood points to a node in the first-order first neighborhood. An oriented edge between any node in the first-order second neighborhood and the node A points from the node A, and an oriented edge connected to any node in the second-order second neighborhood points from a node in the first-order second neighborhood.

The embodiments of this disclosure provides two illustrative implementations, where the first implementation determines embedding features of a node based on probability information of determining first neighborhood nodes and second neighborhood nodes based on the node, as illustrated in steps 304-307 below; the second implementation determines embedding features of a node by a negative sampling on a first neighborhood and a second neighborhood of the node, as illustrated in steps 308-310 below.

304: Determine, based on the first embedding features of the N nodes and the second embedding features of the plurality of first neighborhood nodes, first probability information, the first probability information being used for indicating a probability of determining the plurality of first neighborhood nodes based on the N nodes.

In the embodiments of this disclosure, for a node $v_n$ in a graph, the node $v_n$ corresponds to an initiation embedding feature $s_n$ (also referred to as a source role characterization vector) and a reception embedding feature $t_n$ (also referred to as a target role characterization vector) in an embedding space. Therefore, the final target is to determine an initiation embedding matrix S' formed by initiation embedding features of the M nodes and a reception embedding matrix T' formed by reception embedding features of the M nodes in the target graph. The elements in the initiation embedding matrix S' represent initiation embedding features of the nodes in the target graph, and the elements in the reception embedding matrix T' represent reception embedding features of the nodes in the target graph.

In the embodiments of this disclosure, the first embedding features refer to embedding features of the N nodes, and for any node of the N nodes, the first embedding features of the node include an initiation embedding feature of the node and a reception embedding feature of the node. Each of the N nodes corresponds to at least one first neighborhood node. The second embedding features refer to embedding features of the plurality of first neighborhood nodes, and for any first neighborhood node, the second embedding features of the first neighborhood node include an initiation embedding feature of the first neighborhood node and a reception embedding feature of the first neighborhood node.

In some embodiments, for a node $v_n$, when determining a first neighborhood node $v_i$ of the node based on the node $v_n$, the node $v_n$ is a receiver of a traffic relationship, and the first neighborhood node $v_i$ is an initiator of the traffic relationship. Therefore, a probability of the node $v_n$ determining the first neighborhood node $v_i$ in the whole target graph is defined based on a softmax function, so as to obtain the first probability information. The step of the server determining, based on the first embedding features of the N nodes and the second embedding features of the plurality of first neighborhood nodes, first probability information is as follows. The server acquires N first intermediate embedding features from the first embedding features of the N nodes, the N first intermediate embedding features being used for representing features of the N nodes as the receivers, i.e., reception embedding features of the N nodes. The server acquires a plurality of second intermediate embedding features from the second embedding features of the plurality of first neighborhood nodes, the plurality of second intermediate embedding features being used for representing features of the plurality of first neighborhood nodes as the initiators, i.e., initiation embedding features of the plurality of first neighborhood nodes. The server acquires M seventh intermediate embedding features of the M nodes, the M seventh intermediate embedding features being used for representing features of the M nodes as the initiators, i.e., initiation embedding features of the M nodes. Finally, the first probability information is determined based on the N first intermediate embedding features, the plurality of second intermediate embedding features, and the M seventh intermediate embedding features. Accordingly, the calculation method for the first probability information is shown in Formula (3):

$$p_s(v_i \mid v_n) = \frac{\exp(t_n^T s_i)}{\sum_{m=1}^{M} \exp(t_n^T s_m)}; \quad (3)$$

where $p_s(v_i|v_n)$ represents the following probability in the first probability information: the probability of determining a first neighborhood node $v_i$ based on the node $v_n$ in the whole target graph; $\exp(\cdot)$ represents an exponential function with e as the base; $t_n$ represents a first intermediate embedding feature of the node $v_n$; T represents matrix transpose; $s_i$ represents a second intermediate embedding feature of the first neighborhood node $v_i$; M represents the total number of nodes in the target graph, and M is a positive integer; $s_m$ represents a seventh intermediate embedding feature of the node $v_m$, and the node $v_m$ represents the $m^{th}$ node in the target graph.

305: Determine, based on the first embedding features of the N nodes and the third embedding features of the plurality of second neighborhood nodes, second probability information, the second probability information being used for indicating a probability of determining the plurality of second neighborhood nodes based on the N nodes.

In the embodiments of this disclosure and similar to the step 304, for a node $v_n$, when determining a second neighborhood node $v_j$ of the node based on the node $v_n$, the node $v_n$ is an initiator of a traffic relationship, and the second neighborhood node $v_j$ is a receiver of the traffic relationship. Therefore, a probability of the node $v_n$ determining the second neighborhood node $v_j$ in the whole target graph is defined based on the softmax function, so as to obtain the second probability information.

In the embodiments of this disclosure, each of the N nodes corresponds to at least one second neighborhood node. The third embedding features refer to embedding features of the plurality of second neighborhood nodes, and for any second neighborhood node, the third embedding features of the second neighborhood node include an initiation embedding feature of the second neighborhood node and a reception embedding feature of the second neighborhood node.

The step of the server determining, based on the first embedding features of the N nodes and the third embedding features of the plurality of second neighborhood nodes, second probability information is as follows. The server acquires N fourth intermediate embedding features from the first embedding features of the N nodes, the N fourth intermediate embedding features being used for representing features of the N nodes as the initiators, i.e., initiation embedding features of the N nodes. The server acquires a plurality of fifth intermediate embedding features from the third embedding features of the plurality of second neighborhood nodes, the plurality of fifth intermediate embedding features being used for representing features of the plurality of second neighborhood nodes as the receivers, i.e., reception embedding features of the plurality of second neighborhood nodes. The server acquires M eighth intermediate embedding features of the M nodes, the M eighth intermediate embedding features being used for representing features of the M nodes as the receivers, i.e., reception embedding features of the M nodes. Finally, the second probability information is determined based on the N fourth intermediate embedding features, the plurality of fifth intermediate embedding features, and the M eighth intermediate embedding features. Accordingly, the calculation method for the second probability information is shown in Formula (4):

$$p_t(v_j \mid v_n) = \frac{\exp(s_n^T t_j)}{\sum_{m=1}^{M} \exp(s_n^T t_m)}; \quad (4)$$

where $p_t(v_j|v_n)$ represents the following probability in the second probability information: the probability of determining a second neighborhood node $v_j$ based on the node $v_n$ in the whole target graph; $\exp(\cdot)$ represents an exponential function with e as the base; $s_n$ represents a fourth intermediate embedding feature of the node $v_n$; T represents matrix transpose; $t_j$ represents a fifth intermediate embedding feature of the second neighborhood node $v_j$; M represents the total number of nodes in the target graph, and M is a positive integer; $t_m$ represents an eighth intermediate embedding feature of the node $v_m$, and the node $v_m$ represents the $m^{th}$ node in the target graph.

306: Determine, based on the first probability information and the second probability information, a second objective function.

In the embodiments of this disclosure, in order to retain information in a first neighborhood and a second neighborhood of a node to a maximum extent, the objective function is constructed with an idea of maximum likelihood estimation. Therefore, for a given node $v_n$, the purpose of multiple iterations is to maximize the likelihood function of determining neighborhood nodes of the node $v_n$ based on the node $v_n$, the neighborhood nodes including the first neighborhood node and the second neighborhood node. Assuming that the probabilities of the node $v_n$ determining the neighborhood nodes are independent of each other, the likelihood function is shown in Formula (5):

$$\max_{S',T'} p(N_s(v_n), N_t(v_n) \mid v_n) = \max_{S',T'} \prod_{v_i \in N_s(v_n)} p_s(v_i \mid v_n) \times \prod_{v_j \in N_t(v_n)} p_t(v_j \mid v_n); \quad (5)$$

where $$\max_{S',T'} p(N_s(v_n), N_t(v_n) \mid v_n)$$

represents a maximum likelihood function; S' represents an initiation embedding matrix; T' represents a reception embedding matrix; $N_s(v_n)$ represents the first neighborhood within the order R of the node $v_n$; $N_t(v_n)$ represents the second neighborhood within the order R of the node $v_n$; $\Pi(\cdot)$ represents a continued multiplication function; $p_s(v_i|v_n)$ represents the following probability in the first probability information: the probability of determining a first neighborhood node $v_i$ based on the node $v_n$ in the whole target graph; and $p_t(v_j|v_n)$ represents the following probability in the second probability information: the probability of determining a second neighborhood node $v_j$ based on the node $v_n$ in the whole target graph.

In some embodiments, the server can convert the maximization problem in Formula (5) above into a minimization problem based on a negative log likelihood function, resulting in a second objective function, as shown in Formula (6):

$$L_{likelihood} = -\sum_{v_i \in N(v_n)} \log \frac{\exp(t_n^T s_i)}{\sum_{m=1}^{M} \exp(t_n^T s_m)} - \sum_{v_j \in N_t(v_n)} \log \frac{\exp(s_n^T t_j)}{\sum_{m=1}^{M} \exp(s_n^T t_m)}; \quad (6)$$

where $L_{likelihood}$ represents a negative log likelihood function; $N_s(v_n)$ represents the first neighborhood within the order R of the node $v_n$; $N_t(v_n)$ represents the second neighborhood within the order R of the node $v_n$; $v_i$ represents a first neighborhood node; $v_j$ represents a second neighborhood node; $\log(\cdot)$ represents a log function; $\exp(\cdot)$ represents an exponential function with e as the base; $t_n$ represents a first intermediate embedding feature of the node $v_n$; T represents matrix transpose; $s_i$ represents a second intermediate embedding feature of the first neighborhood node $v_i$; M represents the total number of nodes in the target graph, and M is a positive integer; $s_m$ represents a seventh intermediate embedding feature of the node $v_m$, and the node $v_m$ represents the $m^{th}$ node in the target graph; $s_n$ represents a fourth intermediate embedding feature of the node $v_n$; $t_m$ represents a fifth intermediate embedding feature of the second neighborhood node $v_j$; and $t_m$ represents an eighth intermediate embedding feature of the node $v_m$.

307: Optimize the second objective function to obtain the fourth embedding features of the N nodes.

In the embodiments of this disclosure, the server can perform iterations based on the second objective function to acquire the fourth embedding features of the N nodes. The fourth embedding features represent the updated initiation embedding features and reception embedding features of the N nodes after iterations. Since the optimization objective of the second objective function is minimization, the server performs multiple iterations based on a stochastic gradient descent method, so as to obtain the initiation embedding features and reception embedding features of the N nodes.

In some embodiments, since direct optimization of the second objective function described above may be complex, the server may perform the optimization in a way of negative sampling contrast learning. Accordingly, the server can convert the problem of optimizing the second objective function into the problem of optimizing the first objective function by performing steps 308-310 instead of steps 304-307, the first objective function being detailed in steps 308-310.

For a node $v_n$ in the graph, a first neighborhood and a second neighborhood of the node $v_n$ have different negative sample distributions, the first neighborhood including first neighborhood nodes $v_i$ of the node $v_n$ and the second neighborhood including second neighborhood nodes $v_j$ of the node $v_n$. When the first neighborhood of the node $v_n$ is negatively sampled, the negative sampling focuses on first neighborhood nodes $v_i$ from which oriented edges pointing to the node $v_n$, so as to obtain node in-degree distribution information, i.e., representing a distribution of the number of oriented edges pointing to the current node $v_n$. When the second neighborhood of the node $v_n$ is negatively sampled, the negative sampling focuses on second neighborhood nodes $v_j$ to which oriented edges pointing from the node $v_n$, so as to obtain node out-degree distribution information, i.e., representing a distribution of the number of oriented edges pointing from the current node $v_n$. The calculation methods for the node in-degree distribution information and the node out-degree distribution information are shown in Formula (7) and Formula (8):

$$p_{neg}^{in}(v_n) = \frac{(d_n^{in})^{3/4}}{\sum_{m=1}^{M}(d_m^{in})^{3/4}}; \quad (7)$$

$p_{neg}^{in}(v_n)$ represents the distribution of the number of oriented edges pointing to the node $v_n$ in the node in-degree distribution information; $d_n^{in}$ represents the number of oriented edges pointing to the node $v_n$; M represents the total number of nodes in the target graph, and M is a positive integer; $d_m^{in}$ represents the number of oriented edges pointing to the node $v_m$, and the node $v_m$ represents the $m^{th}$ node in the target graph.

$$p_{neg}^{out}(v_n) = \frac{(d_n^{out})^{3/4}}{\sum_{m-1}^{M}(d_m^{out})^{3/4}}; \quad (8)$$

$p_{neg}^{out}(v_n)$ represents the distribution of the number of oriented edges pointing from the node $v_n$; $d_n^{out}$ represents the number of oriented edges pointing from the node $v_n$; M represents the total number of nodes in the target graph, and M is a positive integer; $d_m^{out}$ represents the number of oriented edges pointing from the node $v_m$, and the node $v_m$ represents the $m^{th}$ node in the target graph.

308: Determine, based on the first embedding features of the N nodes, the second embedding features of the plurality of first neighborhood nodes, node in-degree distribution information, and fifth embedding features of a plurality of first nodes, a first function, the node in-degree distribution information being used for representing a node in-degree distribution of the N nodes, the plurality of first nodes being obtained based on a negative sampling on first neighborhoods of the N nodes, the first neighborhoods including the plurality of first neighborhood nodes.

In the embodiments of this disclosure, after obtaining the node in-degree distribution information, the server can acquire, from the parameter server, the first embedding features of the N nodes after the $(z-_1)^{th}$ iteration, the second embedding features of the plurality of first neighborhood nodes, and the fifth embedding features of the plurality of first nodes, and then determine a first function based on the acquired features above. For a node $v_n$ in a graph, the node $v_n$ corresponds to an initiation embedding feature $s_n$ and a reception embedding feature $t_n$ in an embedding space. Therefore, the final target is to determine an initiation embedding matrix S' formed by initiation embedding features of the M nodes and a reception embedding matrix T' formed by reception embedding features of the M nodes in the target graph. The elements in the initiation embedding matrix S' represent initiation embedding features of the nodes in the target graph, and the elements in the reception embedding matrix T' represent reception embedding features of the nodes in the target graph.

In the embodiments of this disclosure, the fifth embedding features refer to embedding features of the plurality of first nodes, and for any first node, the fifth embedding features of the first node include an initiation embedding feature of the first node and a reception embedding feature of the first node.

For a node $v_n$, when determining a first neighborhood node $v_i$ of the node based on the node $v_n$, the node $v_n$ is a receiver of a traffic relationship, and the first neighborhood node $v_i$ is an initiator of the traffic relationship. When the traffic relationship is a transfer, the user account represented by the first neighborhood node $v_i$ makes a transfer to the user account represented by the node $v_n$. The first function can be determined based on the node in-degree distribution information obtained by the negative sampling.

In some embodiments, the step of the server determining, based on the first embedding features of the N nodes, the second embedding features of the plurality of first neighborhood nodes, node in-degree distribution information, and fifth embedding features of a plurality of first nodes, a first function is as follows. The server acquires N first intermediate embedding features from the first embedding features of the N nodes, the N first intermediate embedding features being used for representing features of the N nodes as the receivers, i.e., reception embedding features of the N nodes. The server acquires a plurality of second intermediate embedding features from the second embedding features of the plurality of first neighborhood nodes, the plurality of second intermediate embedding features being used for representing features of the plurality of first neighborhood nodes as the initiators, i.e., initiation embedding features of the plurality of first neighborhood nodes. The server determines, based on the node in-degree distribution information, first expectation information, the first expectation information being used for representing a mathematical expectation of the plurality of first nodes satisfying the node in-degree distribution information. The server acquires a plurality of third intermediate embedding features from the fifth embedding features of the plurality of first nodes, the plurality of third intermediate embedding features being used for representing features of the plurality of first nodes as the initiators, i.e., initiation embedding features of the plurality of first nodes. Finally, the server determines, based on the N first intermediate embedding features, the plurality of second intermediate embedding features, the first expectation information, and the plurality of third intermediate embedding features, the first function. By determining the first function based on the node in-degree distribution information obtained by negative sampling, the computational complexity can be significantly reduced as it is not necessary to calculate based on the embedding features of all nodes in the target graph, thereby improving the computational efficiency and saving computational resources.

The first function is shown in Formula (9):

$$L_1 = -\sum_{v_i \in N_s(v_n)} \left[ \log\sigma(t_n^T s_i) + \sum_{k=1}^{K} E_{v_k \sim p_{neg}^{in}(v_g)} \log\sigma(-t_n^T s_k) \right]; \quad (9)$$

where $L_1$ represents the first function, and $N_s(v_n)$ represents the first neighborhood within the order R of the node $v_n$; $v_i$ represents a first neighborhood node; $\log(\cdot)$ represents a log function; $\sigma(\cdot)$ represents a sigmoid function, and $t_n$ represents a first intermediate embedding feature of the node $v_n$; T represents matrix transpose; $s_i$ represents a second intermediate embedding feature of the first neighborhood node $v_i$; K represents the number of first nodes obtained by a negative sampling on the first neighborhood, and K is a positive integer; $E_{v_k \sim p_{neg}^{in}(v_n)}$ represents first expectation information; ok represents the $k^{th}$ first node; $p_{neg}^{in}(v_n)$ represents the distribution of the number of oriented edges pointing to the node $v_n$ in the node in-degree distribution information; and $s_k$ represents a third intermediate embedding feature of the first node $v_k$.

309: Determine, based on the first embedding features of the N nodes, the third embedding features of the plurality of second neighborhood nodes, node out-degree distribution information, and sixth embedding features of a plurality of second nodes, a second function, the node out-degree distribution information being used for representing a node out-degree distribution of the N nodes, the plurality of second nodes being obtained based on a negative sampling on second neighborhoods of the N nodes, the second neighborhoods including the plurality of second neighborhood nodes.

In the embodiments of this disclosure and similar to the step 308, for a node $v_n$ when determining a second neighborhood node $v_j$ of the node based on the node $v_n$, the node $v_n$ is an initiator of a traffic relationship, and the second neighborhood node $v_j$ is a receiver of the traffic relationship. When the traffic relationship is a transfer, the user account represented by the second neighborhood node $v_j$ receives a transfer from the user account represented by the node $v_n$. The second function can be determined based on the node out-degree distribution information obtained by the negative sampling.

In the embodiments of this disclosure, the sixth embedding features refer to embedding features of the plurality of second nodes, and for any second node, the sixth embedding features of the second node include an initiation embedding feature of the second node and a reception embedding feature of the second node.

In some embodiments, the step of the server determining, based on the first embedding features of the N nodes, the third embedding features of the plurality of second neighborhood nodes, node out-degree distribution information, and sixth embedding features of a plurality of second nodes, a second function is as follows. The server acquires N fourth intermediate embedding features from the first embedding features of the N nodes, the N fourth intermediate embedding features being used for representing features of the N nodes as the initiators, i.e., initiation embedding features of the N nodes. The server acquires a plurality of fifth intermediate embedding features from the third embedding features of the plurality of second neighborhood nodes, the plurality of fifth intermediate embedding features being used for representing features of the plurality of second neighborhood nodes as the receivers, i.e., reception embedding features of the plurality of neighborhood nodes. The server determines, based on the node out-degree distribution information, second expectation information, the second expectation information being used for representing a mathematical expectation of the plurality of second nodes satisfying the node out-degree distribution information. The server acquires a plurality of sixth intermediate embedding features from the embedding features of the plurality of second nodes, the plurality of sixth intermediate embedding features being used for representing features of the plurality of second nodes as the receivers, i.e., reception embedding features of the plurality of second nodes. Finally, the server determines, based on the N fourth intermediate embedding features, the plurality of fifth intermediate embedding features, the second expectation information, and the plurality of sixth intermediate embedding features, the second function. By determining the second function based on the node out-degree distribution information obtained by negative sampling, the computational complexity can be significantly reduced as it is not necessary to calculate based on the embedding features of all nodes in the target graph, thereby improving the computational efficiency and saving computational resources.

The second function is shown in Formula (10):

$$L_2 = -\sum_{v_j \in N_t(v_n)} \left[ \log\sigma(s_n^T t_j) + \sum_{l=1}^{L} E_{v_l \sim p_{neg}^{out}(v_n)} \log\sigma(-s_n^T t_l) \right]; \quad (10)$$

where $L_2$ represents the second function, and $N_t(v_n)$ represents the second neighborhood within the order R of the node $v_n$; $v_j$ represents a second neighborhood node; $\log(\cdot)$ represents a log function; $\sigma(\cdot)$ represents a sigmoid function, and $s_n$ represents a fourth intermediate embedding features of the node $v_n$; T represents matrix transpose; $t_j$ represents a fifth intermediate embedding feature of the second neighborhood node $v_j$; L represents the number of second nodes obtained by a negative sampling on the first neighborhood, and L is a positive integer; $E_{v_l \sim p_{neg}^{out}(v_n)}$ represent second expectation information; $v_l$ represents the $1^{st}$ second node; $p_{neg}^{out}(v_n)$ represents the distribution of the number of oriented edges pointing from the node $v_n$ in the node out-degree distribution information; and $t_l$ represents a sixth intermediate embedding feature of the second node $v_l$.

310: Optimize a first objective function formed based on the first function and the second function to obtain the fourth embedding features of the N nodes.

In the embodiments of this disclosure, the server can construct the first objective function based on the first function and the second function, the first objective function being shown in Formula (11):

$$L_{neg} = L_1 + L_2 \quad (11);$$

where $L_{neg}$ represents the first objective function; $L_1$ represents the first function; and $L_2$ represents the second function.

The server uses a small batch stochastic gradient descent method to optimize the first objective function based on multiple iterations so as to obtain the fourth embedding features of the N nodes above.

In some embodiments, in the case where first-order neighborhoods are preserved, the desired effect can be achieved on highly sparse graph data. Besides, in the case where first-order first neighborhoods and first-order second neighborhoods of nodes are preserved, the summation of the neighborhoods of the nodes in the first objective function is equivalent to the summation of all the edges in the graph. Therefore, the server can convert the first objective function into a third objective function.

The third objective function is a function expressed in terms of edges, and for an oriented edge $(v_x, v_y)$, a node $v_x$ is an initiator of a traffic relationship corresponding to the oriented edge, and a node $v_y$ is a receiver of the traffic relationship corresponding to the oriented edge, i.e., the node $v_x$ plays a source role, and the node $v_y$ plays a target role. When the oriented edge $(v_x, v_y)$ is observed in a forward direction, attention is paid to the probability of determining the node $v_y$ based on the node $v_x$, and a negative sampling is performed on a first-order second neighborhood of the node $v_x$ to obtain negatively sampled nodes $v_f$; and when the oriented edge $(v_x, v_y)$ is observed in a reverse direction, attention is paid to the probability of determining the node $v_x$ based on the node $v_y$, and a negative sampling is performed on a first-order first neighborhood of the node $v_y$ to obtain negatively sampled nodes $v_g$, i.e., information about both the forward direction and the reverse direction is considered, so the algorithm corresponding to the third objective function can be referred to as a bidirectional graph embedding (BGE) algorithm.

The third objective function is shown in Formula (12):

$$L_3 = - \sum_{(v_x, v_y) \in E_{graph}} \left[ \log \sigma(s_x^T t_y) + \sum_{f=1}^{F} E_{v_f \sim p_{neg}^{out}(v_x)} \log \sigma(-s_x^T t_f) + \sum_{g=1}^{G} E_{v_g \sim p_{neg}^{in}(v_y)} \log \sigma(-s_g^T t_y) \right]; \quad (12)$$

where $L_3$ represents the third objective function; $(v_x, v_y)$ represents the oriented edge between the node $v_x$ and the node $v_y$ in the target graph, where the oriented edge points from the node $v_x$ and to the node $v_y$; $E_{graph}$ represents a set of oriented edges in the target graph; log(·) represents a log function; represents a sigmoid function; $s_x$ represents an initiation embedding feature of the node $v_x$; T represents matrix transpose; $t_y$ represents a reception embedding feature of the node $v_y$; F represents the number of negatively sampled nodes $v_f$ obtained by a negative sampling on the first-order second neighborhood of the node $v_x$, and F is a positive integer; $p_{neg}^{out}(v_x)$ represents the distribution of the number of oriented edges pointing from the node $v_x$ in the node out-degree distribution information; $t_f$ represents a reception embedding feature of the node $v_f$; G represents the number of negatively sampled nodes $v_g$ obtained by a negative sampling on the first-order first neighborhood of the node $v_y$, and G is a positive integer; $p_{neg}^{in}(v_y)$ represents the distribution of the number of oriented edges pointing to the node $v_y$ in the node in-degree distribution information; and $s_g$ represents an initiation embedding feature of the node $v_g$.

Step 311 may be performed by the server after multiple iterations based on the implementations shown in steps 302-307 above, or step 311 may be performed by the server after multiple iterations based on the implementations shown in steps 302, 303, and 308-310 above.

311: Obtain, in response to the end of multiple iterations, initiation embedding features and reception embedding features corresponding to the M nodes, the initiation embedding features being used for representing features of the corresponding nodes as the initiators, and the reception embedding features being used for representing features of the corresponding nodes as the receivers.

In the embodiments of this disclosure, the server ends the iterations after iterating for a target number of rounds to obtain an initiation embedding feature of each node as an initiator in the target graph and a reception embedding feature of each node as a receiver.

In some embodiments, for any node, the server can concatenate the initiation embedding feature and the reception embedding feature of the node with the account feature of the user account represented by the node, and then determine, based on the concatenated feature, whether there is a risk in traffic between the node and other nodes. When the user account corresponding to the node initiates a transfer request to a user account corresponding to another node, the server can concatenate corresponding initiation embedding features and reception embedding features on the basis of the account features of the two user accounts above and input the concatenated feature into an anti-fraud model so as to determine whether the transfer request is a fraudulent traffic. By introducing the embedding features obtained based on the graph data processing method provided by the embodiments of this disclosure into the anti-fraud model, the hit rate of the number of fraud transactions of the anti-fraud model is relatively improved from 14% to 21%, and the hit rate of the fraud amount is relatively improved from 27% to 47%. Furthermore, the graph data processing method provided in this disclosure is 2-5 times as efficient as the solutions in the related art in acquiring embedding features of nodes, and the efficiency is significantly improved.

Figure 6:
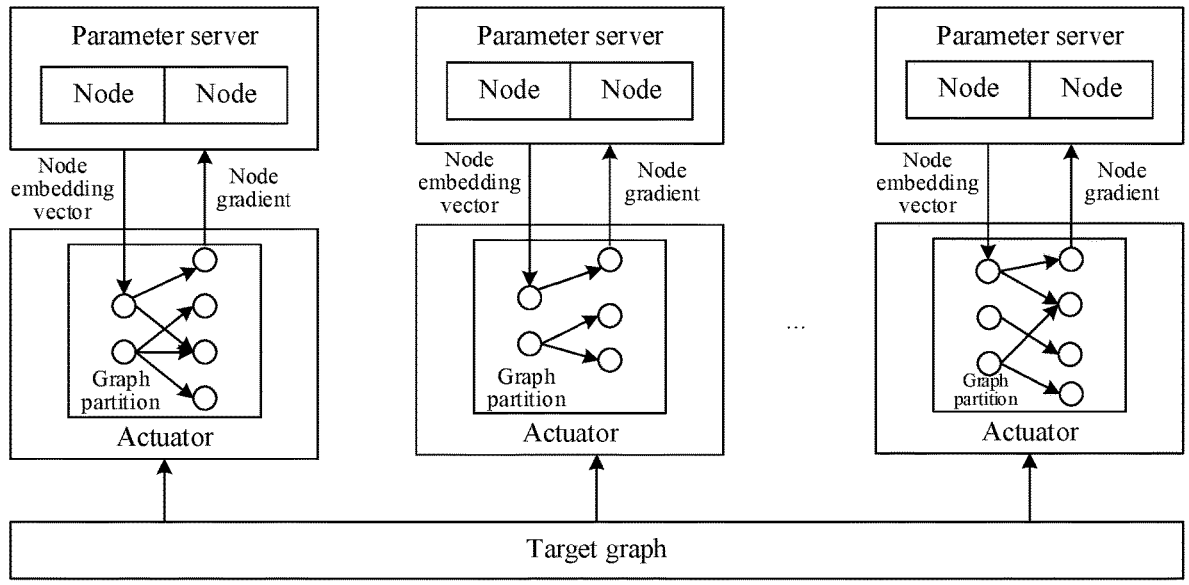
FIG. 6 is a schematic diagram of a distributed computing architecture according to an embodiment of this disclosure.

In order to make one easily understand the flow of the graph data processing method provided by the embodiments of this disclosure being performed by a server in a distributed manner, reference is made to FIG. 6, which is a schematic diagram of a distributed computing architecture according to an embodiment of this disclosure. In FIG. 6, the distributed computing architecture includes a plurality of actuators and a plurality of parameter servers. The server partitions a target graph, stores edge tables corresponding to the graph partitions in the actuators, and stores nodes corresponding to the graph partitions in corresponding parameter servers. Each node has two embedding features, one representing the embedding feature of the node as a source role and one representing the embedding feature of the node as a target role. The parameter servers initialize the embedding features of the nodes, and the actuators separately pulls first embedding features of N nodes, second embedding features of a plurality of first neighborhood nodes, and third embedding features of a plurality of second neighborhood nodes from the parameter servers in batches in corresponding graph partitions so as to determine N feature gradients of the N nodes. The N feature gradients are then uploaded to the parameter servers, and fourth embedding features of the N nodes are determined by the parameter servers based on the first embedding features and the N feature gradients of the N nodes so as to achieve an update of the embedding features of the nodes. Finally, iterations end after iterating for a target number of rounds.

The graph data processing method provided by the embodiments of this disclosure can also be combined with existing models to implement different traffics. In combination with a recommendation model, for example, as applied to a social scenario, initiation embedding features and reception embedding features of nodes obtained based on the graph data processing method provided by the embodiments of this disclosure are introduced into a friend recommendation model, so that the recommendation model can recommend friends for users more accurately. In addition, when applied to a shopping scenario, initiation embedding features and reception embedding features of nodes obtained based on the graph data processing method provided by the embodiments of this disclosure are introduced into an item recommendation model, so that the recommendation model can recommend items for users more accurately. It is not further detailed herein.

The embodiments of this disclosure illustrates that there is one type of traffic relationship between nodes. There may be multiple types of traffic relationships between objects in object data, such as a transfer relationship and a following relationship between object A and object B, and a transfer relationship and a like relationship between object A and object C. The following relationship and the like relationship belong to the same type of traffic relationship as they generally occur in the same traffic scenario, such as watching a live broadcast. However, the transfer relationship and the two relationships above belong to different types of traffic relationships as they generally occur in different traffic scenarios. For example, the transfer relationship may occur in a social scenario. Therefore, the server can determine multiple target graphs based on graph data according to the relationship types between nodes, with oriented edges in the same target graph representing the same type of traffic relationship and oriented edges in different target graphs representing different types of traffic relationships. Based on the graph data processing method provided in the embodiments of this disclosure, the server separately processes the multiple target graphs, and then performs concatenation or weighted fusion on initiation embedding features and reception embedding features obtained for the same node based on the different target graphs so as to obtain the final initiation embedding features and reception embedding features of the node. With processing according to different types of traffic relationships, embedding features of multiple identities can be determined for a node when the node has more than two identities, thereby facilitating the use of embedding features of corresponding identities for different traffic scenarios.

The embodiments of this disclosure provides a novel graph data processing method, including: acquiring N nodes from a target graph in each iteration; and then determining, based on first embedding features of the N nodes, second embedding features of a plurality of first neighborhood nodes associated with the N nodes, and third embedding features of a plurality of second neighborhood nodes associated with the N nodes, fourth embedding features of the N nodes, so as to complete an iteration and update the embedding features of the N nodes. Since not all M nodes in the target graph are processed, the calculation amount can be greatly reduced. After multiple iterations, initiation embedding features of the M nodes as initiators as well as reception embedding features of the M nodes as receivers can be obtained, so that the embedding features of the nodes may retain information about the first neighborhoods and the second neighborhoods to a maximum extent, so the pointing relationship of an oriented edge can be determined based on the inner product between embedding features of two nodes connected by the oriented edge, so that both the dual identity of a node and the pointing relationship of an oriented edge can be expressed.

Figure 7:
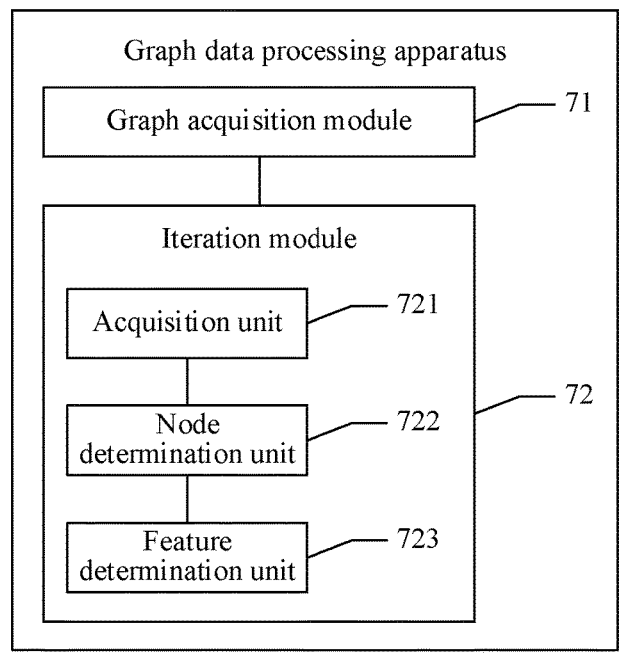
FIG. 7 is a block diagram of a graph data processing apparatus according to an embodiment of this disclosure.

FIG. 7 is a block diagram of a graph data processing apparatus according to an embodiment of this disclosure. The apparatus is used for performing the steps in the graph data processing method described above and, with reference to FIG. 7, the apparatus includes: a graph acquisition module 71 and an iteration module 72, where the iteration module 72 includes an acquisition unit 721, a node determination unit 722, and a feature determination unit 723.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The graph acquisition module 71 is configured to acquire, based on object data, a target graph, the target graph including M nodes for representing M objects, M being a positive integer greater than 1, oriented edges in the target graph being used for representing presence of traffic relationships between objects corresponding to the connected nodes, and pointing nodes of the oriented edges being initiators of the traffic relationships, and pointed nodes of the oriented edges being receivers of the traffic relationships.

The iteration module 72 is configured to perform, based on the M nodes and oriented edges between the M nodes, multiple iterations to obtain initiation embedding features and reception embedding features corresponding to the M nodes, the initiation embedding features being used for representing features of the corresponding nodes as the initiators, and the reception embedding features being used for representing features of the corresponding nodes as the receivers.

The iteration module 72 includes the following units: an acquisition unit 721, a node determination unit 722, and a feature determination unit 723, etc.

The acquisition unit 721 is configured to acquire N nodes from the M nodes, N being a positive integer equal to or less than M.

The node determination unit 722 is configured to determine, based on oriented edges associated with the N nodes, a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes.

The feature determination unit 723 is configured to determine, based on first embedding features of the N nodes, second embedding features of the plurality of first neighborhood nodes, and third embedding features of the plurality of second neighborhood nodes, fourth embedding features of the N nodes, the fourth embedding features of the N nodes representing the updated initiation embedding features and reception embedding features of the N nodes after a $z^{th}$ iteration.

Figure 8:
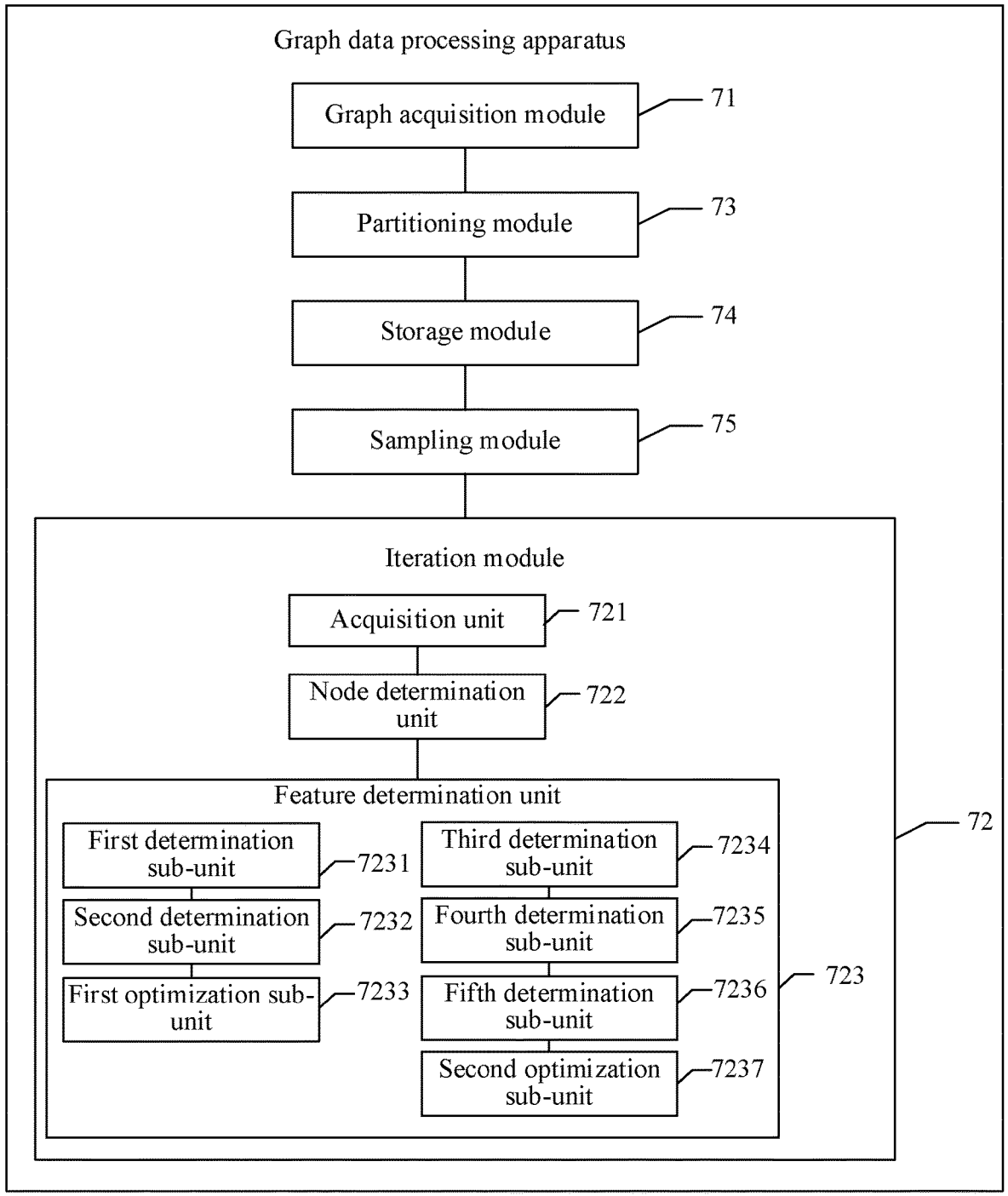
FIG. 8 is a block diagram of another graph data processing apparatus according to an embodiment of this disclosure.

FIG. 8 is a block diagram of another graph data processing apparatus according to an embodiment of this disclosure. Referring to FIG. 8, in some embodiments, the feature determination unit 723 includes the following sub-units.

A first determination sub-unit 7231 is configured to determine, based on the first embedding features of the N nodes, the second embedding features of the plurality of first neighborhood nodes, node in-degree distribution information, and fifth embedding features of a plurality of first nodes, a first function, the node in-degree distribution information being used for representing a node in-degree distribution of the N nodes, the plurality of first nodes being obtained based on a negative sampling on first neighborhoods of the N nodes, the first neighborhoods including the plurality of first neighborhood nodes, and the first embedding features of the N nodes, the second embedding features of the plurality of first neighborhood nodes, and the third embedding features of the plurality of second neighborhood nodes being obtained by performing a $(z-1)^{th}$ iteration.

A second determination sub-unit 7232 is configured to determine, based on the first embedding features of the N nodes, the third embedding features of the plurality of second neighborhood nodes, node out-degree distribution information, and sixth embedding features of a plurality of second nodes, a second function, the node out-degree distribution information being used for representing a node out-degree distribution of the N nodes, the plurality of second nodes being obtained based on a negative sampling on second neighborhoods of the N nodes, the second neighborhoods including the plurality of second neighborhood nodes.

A first optimization sub-unit 7233 is configured to optimize, based on a first objective function formed by the first function and the second function, the first objective function to obtain the fourth embedding features of the N nodes.

In some embodiments and with reference to FIG. 8, the first determination sub-unit 7231 is configured to: acquire N first intermediate embedding features from the first embedding features of the N nodes, the N first intermediate embedding features being used for representing features of the N nodes as the receivers; acquire a plurality of second intermediate embedding features from the second embedding features of the plurality of first neighborhood nodes, the plurality of second intermediate embedding features being used for representing features of the plurality of first neighborhood nodes as the initiators; determine, based on the node in-degree distribution information, first expectation information, the first expectation information being used for representing a mathematical expectation of the plurality of first nodes satisfying the node in-degree distribution information; acquire a plurality of third intermediate embedding features from the fifth embedding features of the plurality of first nodes, the plurality of third intermediate embedding features being used for representing features of the plurality of first nodes as the initiators; and determine, based on the N first intermediate embedding features, the plurality of second intermediate embedding features, the first expectation information, and the plurality of third intermediate embedding features, the first function.

In some embodiments, the second determination sub-unit 7232 is configured to: acquire N fourth intermediate embedding features from the first embedding features of the N nodes, the N fourth intermediate embedding features being used for representing features of the N nodes as the initiators; acquire a plurality of fifth intermediate embedding features from the third embedding features of the plurality of second neighborhood nodes, the plurality of fifth intermediate embedding features being used for representing features of the plurality of second neighborhood nodes as the receivers; determine, based on the node out-degree distribution information, second expectation information, the second expectation information being used for representing a mathematical expectation of the plurality of second nodes satisfying the node out-degree distribution information; acquire a plurality of sixth intermediate embedding features from the embedding features of the plurality of second nodes, the plurality of sixth intermediate embedding features being used for representing features of the plurality of second nodes as the receivers; and determine, based on the N fourth intermediate embedding features, the plurality of fifth intermediate embedding features, the second expectation information, and the plurality of sixth intermediate embedding features, the second function.

In some embodiments, the feature determination unit 723 includes the following sub-units.

A third determination sub-unit 7234 is configured to determine, based on the first embedding features of the N nodes and the second embedding features of the plurality of first neighborhood nodes, first probability information, the first probability information being used for indicating a probability of determining the plurality of first neighborhood nodes based on the N nodes.

A fourth determination sub-unit 7235 is configured to determine, based on the first embedding features of the N nodes and the third embedding features of the plurality of second neighborhood nodes, second probability information, the second probability information being used for indicating a probability of determining the plurality of second neighborhood nodes based on the N nodes.

A fifth determination sub-unit 7236 is configured to determine, based on the first probability information and the second probability information, a second objective function.

A second optimization sub-unit 7237 is configured to optimize the second objective function to obtain the fourth embedding features of the N nodes.

In some embodiments, the third determination sub-unit 7234 is configured to: acquire N first intermediate embedding features from the first embedding features of the N nodes, the N first intermediate embedding features being used for representing features of the N nodes as the receivers; acquire a plurality of second intermediate embedding features from the second embedding features of the plurality of first neighborhood nodes, the plurality of second intermediate embedding features being used for representing features of the plurality of first neighborhood nodes as the initiators; acquire M seventh intermediate embedding features of the M nodes, the M seventh intermediate embedding features being used for representing features of the M nodes as the initiators; and determine, based on the N first intermediate embedding features, the plurality of second intermediate embedding features, and the M seventh intermediate embedding features, the first probability information.

In some embodiments, the fourth determination sub-unit 7235 is configured to: acquire N fourth intermediate embedding features from the first embedding features of the N nodes, the N fourth intermediate embedding features being used for representing features of the N nodes as the initiators; acquire a plurality of fifth intermediate embedding features from the third embedding features of the plurality of second neighborhood nodes, the plurality of fifth intermediate embedding features being used for representing features of the plurality of second neighborhood nodes as the receivers; acquire M eighth intermediate embedding features of the M nodes, the M eighth intermediate embedding features being used for representing features of the M nodes as the receivers; and determine, based on the N fourth intermediate embedding features, the plurality of fifth intermediate embedding features, and the M eighth intermediate embedding features, the second probability information.

In some embodiments and with reference to FIG. 8, the apparatus further includes the following modules.

A partitioning module 73 is configured to partition the target graph into at least one graph partition.

A storage module 74 is configured to store, for any graph partition, nodes in the graph partition into a parameter server.

The storage module 74 is further configured to store an edge table corresponding to the graph partition into an actuator corresponding to the graph partition.

A sampling module 75 is configured to sample, for any actuator, the target graph based on the edge table stored in the actuator to obtain a plurality of sampled edges, nodes connected by the plurality of sampled edges being the N nodes.

The acquisition unit 721 is configured to: determine, based on the plurality of sampled edges, N node identifiers; and acquire the N nodes corresponding to the N node identifiers from the parameter server.

In some embodiments, the feature determination unit 723 is configured to: determine, based on the first embedding features of the N nodes, the second embedding features of the plurality of first neighborhood nodes, and the third embedding features of the plurality of second neighborhood nodes, N feature gradients of the N nodes; upload the N feature gradients to the parameter server, and determine, by the parameter server, the fourth embedding features of the N nodes based on the first embedding features and the N feature gradients of the N nodes.

The embodiments of this disclosure provides the graph data processing apparatus performing: acquiring N nodes from a target graph in each iteration; and then determining, based on first embedding features of the N nodes, second embedding features of a plurality of first neighborhood nodes associated with the N nodes, and third embedding features of a plurality of second neighborhood nodes associated with the N nodes, fourth embedding features of the N nodes, so as to complete an iteration and update the embedding features of the N nodes. Since not all M nodes in the target graph are processed, the calculation amount can be greatly reduced. After multiple iterations, initiation embedding features of the M nodes as initiators as well as reception embedding features of the M nodes as receivers can be obtained, so that the embedding features of the nodes may retain information about the first neighborhoods and the second neighborhoods to a maximum extent, so the pointing relationship of an oriented edge can be determined based on the inner product between embedding features of two nodes connected by the oriented edge, so that both the dual identity of a node and the pointing relationship of an oriented edge can be expressed.

It is to be understood that the graph data processing apparatus provided in the embodiment above, when processing data, merely takes the above division of functional modules as an example for illustration. In practical application, the above functionalities may be allocated to be completed by different functional modules according to requirements, i.e., the internal structure of the apparatus may be partitioned into different functional modules so as to complete all or part of the functionalities described above. In addition, the graph data processing apparatus provided in the embodiment above belongs to the same concept as the embodiment of the graph data processing method, and the embodiment of the method may be referred to for the implementation of the apparatus.

In the embodiments of this disclosure, the computer device may be configured as a terminal or a server (e.g., one or more terminals or servers). When the computer device is configured as a terminal, the technical solutions provided in the embodiments of this disclosure can be implemented by the terminal which acts as an executive body. When the computer device is configured as a server, the technical solutions provided in the embodiments of this disclosure can be implemented by the server which acts as an executive body. Also, the technical solutions provided in the embodiments of this disclosure can be implemented by the interaction between the terminal and the server, which is not limited by the embodiments of this disclosure.

Figure 9:
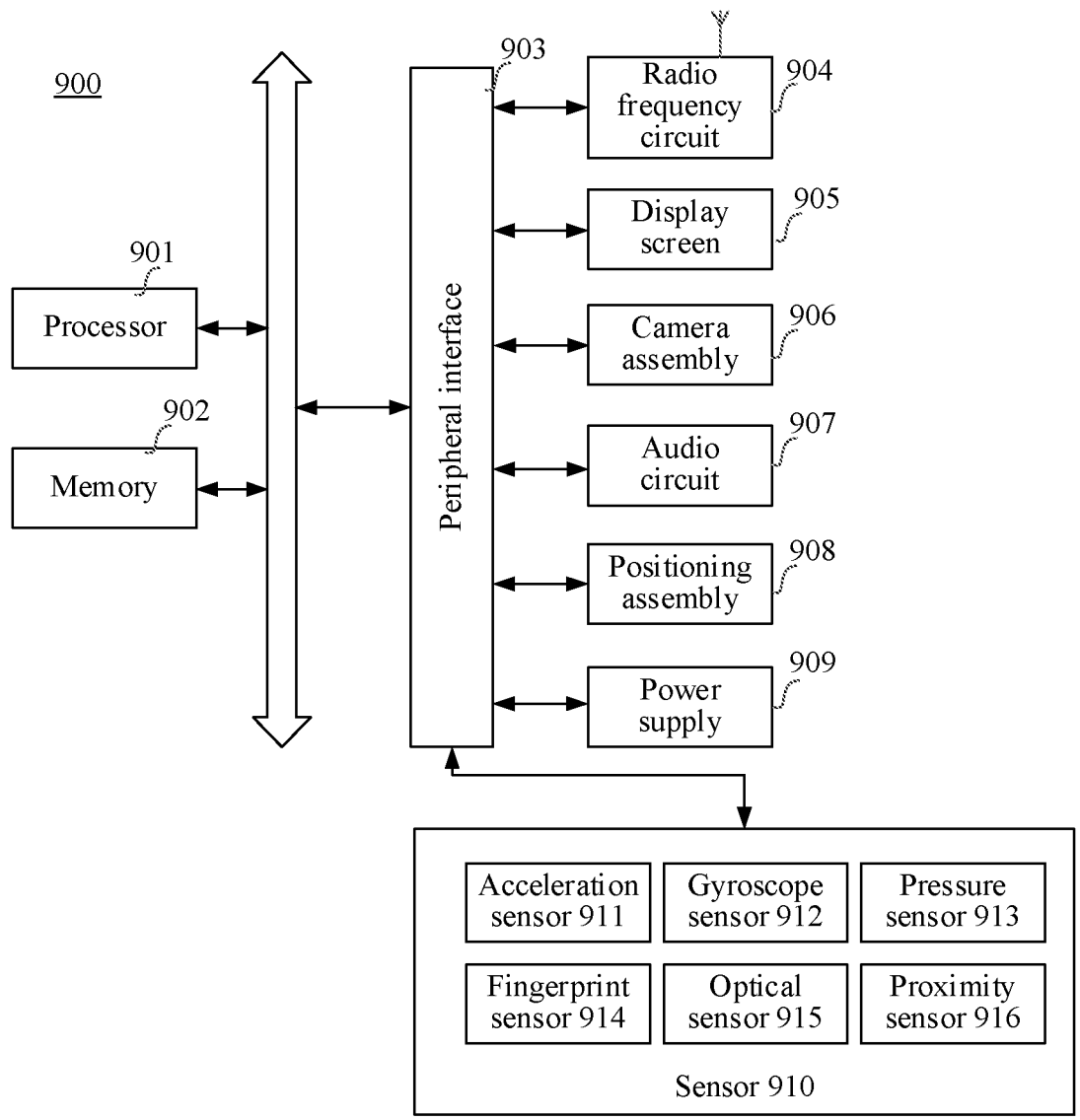
FIG. 9 is a structural block diagram of a terminal according to an embodiment of this disclosure.

FIG. 9 is a structural block diagram of a terminal 900 according to an embodiment of this disclosure. The terminal 900 may be a portable mobile terminal, such as a smart phone, a tablet computer, an MP3 player (Moving Picture Experts Group Audio Layer III), an MP4 player (Moving Picture Experts Group Audio Layer IV), a notebook computer, or a desktop computer. The terminal 900 may also be referred to as another name such as user equipment, a portable terminal, a laptop terminal, or a desktop terminal.

Generally, the terminal 900 includes: a processor 901 and a memory 902.

The processor 901 may include one or more processing cores, such as a 4-core processor or an 8-core processor. The processor 901 may be implemented in at least one hardware form of DSP (Digital Signal Processing), FPGA (Field-Programmable Gate Array), and PLA (Programmable Logic Array). The processor 901 may also include a main processor and a co-processor, where the main processor is a processor for processing data in a wake-up state, also referred to as a CPU (Central Processing Unit), and the co-processor is a low-power processor for processing data in a standby state. In some embodiments, the processor 901 may be integrated with a GPU (Graphics Processing Unit), the GPU being responsible for rendering and drawing the content to be displayed on the display screen. In some embodiments, the processor 901 may further include an AI (Artificial Intelligence) processor. The AI processor is configured to process computing operations related to machine learning.

The memory 902 may include one or more computer-readable storage media. The computer-readable storage media may be non-transitory. The memory 902 may further include a high-speed random access memory and a nonvolatile memory, such as one or more disk storage devices or flash storage devices. In some embodiments, the non-transitory computer-readable storage media in the memory 902 are used for storing at least one computer program containing executable computer instructions for execution by the processor 901 to implement the graph data processing method provided by the embodiment of the method in this disclosure.

In some embodiments, the terminal 900 may further include: a peripheral interface 903 and at least one peripheral. The processor 901, the memory 902, and the peripheral interface 903 may be connected by a bus or a signal line. The peripherals may be connected to the peripheral interface 903 through a bus, a signal line, or a circuit board. The peripherals include: at least one of a radio frequency circuit 904, a display screen 905, a camera assembly 906, an audio circuit 907, a positioning assembly 908, and a power supply 909.

In some embodiments, the terminal 900 further includes one or more sensors 910. The one or more sensors 910 include, but are not limited to: an acceleration sensor 911, a gyroscope sensor 912, a pressure sensor 913, a fingerprint sensor 914, an optical sensor 915, and a proximity sensor 916.

A person skilled in the art will understand that the structure shown in FIG. 9 constitutes no limitation on the terminal 900, and the terminal may include more or fewer components than shown, or some components may be combined, or a different component arrangement may be used.

Figure 10:
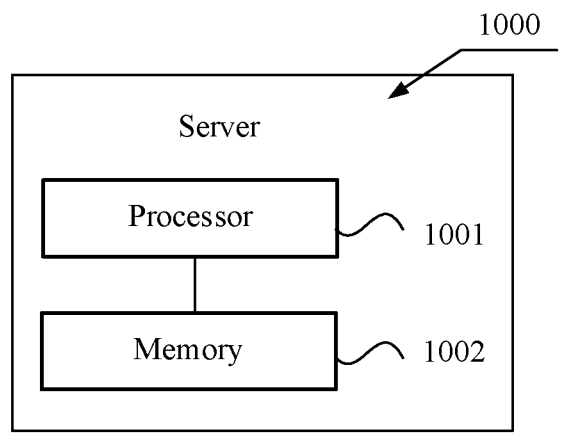
FIG. 10 is a schematic structural diagram of a server according to an embodiment of this disclosure.

FIG. 10 is a schematic structural diagram of a server according to an embodiment of this disclosure. The server 1000 may be largely different due to different configurations or performances, and may include one or more Central Processing Units (CPU) 1001 (and/or other processing units) and one or more memories 1002. At least one computer program is stored in the memory 1002, and the at least one computer program is loaded and executed by the processor 1001 to implement the graph data processing method provided in the embodiments of the method described above. Of course, the server may also have wired or wireless network interfaces, keyboards, input/output interfaces, and other components for input and output, and the server may further include other components for implementing device functions.

An embodiment of this disclosure further provides a computer-readable storage medium storing at least one computer program therein, the at least one computer program being loaded and executed by a processor of a computer device to implement the operations performed by the computer device in the graph data processing method of the embodiment described above. For example, the computer-readable storage medium may be a Read-Only Memory (ROM), a Random Access Memory (RAM), a Compact Disc Read-Only Memory (CD-ROM), a magnetic tape, a floppy disk, an optical data storage device, etc.

In some embodiments, the computer program involved in the embodiments of this disclosure may be deployed to be executed on one computer device, or on a plurality of computer devices located at one site, or on a plurality of computer devices distributed at a plurality of sites and interconnected through a communication network, where the plurality of computer devices distributed at the plurality of sites and interconnected through the communication network may form a block chain system.

An embodiment of this disclosure provides a computer program product including computer program code stored in a computer-readable storage medium. The computer program code, when read by a processor of a computer device from the computer-readable storage medium and executed by the processor, causes the computer device to perform the graph data processing method provided in various implementations described above.

The technical solutions provided in the embodiments of this disclosure may bring the following beneficial effects.

An embodiment of this disclosure provides a technical solution for graph data processing, including: acquiring N nodes from a target graph in each iteration, the N nodes being partial nodes in the target graph; and then determining, based on first embedding features of the N nodes, second embedding features of a plurality of first neighborhood nodes associated with the N nodes, and third embedding features of a plurality of second neighborhood nodes associated with the N nodes, fourth embedding features of the N nodes, so as to complete an iteration and update the embedding features of the N nodes. Since not all M nodes in the target graph are processed, the calculation amount can be greatly reduced. After multiple iterations, initiation embedding features of the M nodes as initiators as well as reception embedding features of the M nodes as receivers can be obtained, so that the embedding features of the nodes may retain information about the first neighborhoods and the second neighborhoods to a maximum extent, which enables the nodes to fully express information in graph data and ensures information integrity in the process of converting the graph data into a target graph.

A person of ordinary skill in the art will understand that all or some of the steps of the embodiments above may be implemented by hardware, or may be implemented by a program instructing relevant hardware. The program may be stored in a computer-readable storage medium. The storage medium described above may be a read-only memory, a magnetic disk, an optical disc, and the like.

While the embodiments described above are merely certain embodiments of this disclosure, they are not intended to limit this disclosure. Any modification, equivalent replacement, or improvement made within the spirit and principle of this disclosure shall fall within the protection scope of this disclosure.

What is claimed is:

1. A graph data processing method applied to a computer device, comprising:

based on object data, acquiring a target graph having M nodes for representing M objects, M being a positive integer, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers, wherein a $z^{th}$ iteration, z being a positive integer, of the multiple iterations comprises:

acquiring N nodes from the M nodes, N being a positive integer equal to or less than M;

based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

2. The method according to claim 1, wherein the determining fourth embedding features of the N nodes comprises:
based on the first embedding features of the N nodes, the second embedding features of the plurality of first neighborhood nodes, node in-degree distribution information, and fifth embedding features of a plurality of first nodes, determining a first function, the node in-degree distribution information being used for representing a node in-degree distribution of the N nodes, the plurality of first nodes being obtained based on a negative sampling on first neighborhoods of the N nodes, the first neighborhoods comprising the plurality of first neighborhood nodes, and the first embedding features of the N nodes, the second embedding features of the plurality of first neighborhood nodes, and the third embedding features of the plurality of second neighborhood nodes being obtained by performing a $(z-1)^{th}$ iteration;
based on the first embedding features of the N nodes, the third embedding features of the plurality of second neighborhood nodes, node out-degree distribution information, and sixth embedding features of a plurality of second nodes, determining a second function, the node out-degree distribution information being used for representing a node out-degree distribution of the N nodes, the plurality of second nodes being obtained based on a negative sampling on second neighborhoods of the N nodes, the second neighborhood comprising the plurality of second neighborhood nodes; and
optimizing a first objective function formed by the first function and the second function, to obtain the fourth embedding features of the N nodes.

3. The method according to claim 2, wherein the determining a first function comprises:
acquiring N first intermediate embedding features from the first embedding features of the N nodes, the N first intermediate embedding features being used for representing features of the N nodes as the receivers;
acquiring a plurality of second intermediate embedding features from the second embedding features of the plurality of first neighborhood nodes, the plurality of second intermediate embedding features being used for representing features of the plurality of first neighborhood nodes as the initiators;
based on the node in-degree distribution information, determining first expectation information used for representing a mathematical expectation of the plurality of first nodes satisfying the node in-degree distribution information;
acquiring a plurality of third intermediate embedding features from the fifth embedding features of the plurality of first nodes, the plurality of third intermediate embedding features being used for representing features of the plurality of first nodes as the initiators; and
based on the N first intermediate embedding features, the plurality of second intermediate embedding features, the first expectation information, and the plurality of third intermediate embedding features, determining the first function.

4. The method according to claim 2, wherein the determining a second function comprises:
acquiring N fourth intermediate embedding features from the first embedding features of the N nodes, the N fourth intermediate embedding features being used for representing features of the N nodes as the initiators;
acquiring a plurality of fifth intermediate embedding features from the third embedding features of the plurality of second neighborhood nodes, the plurality of fifth intermediate embedding features being used for representing features of the plurality of second neighborhood nodes as the receivers;
based on the node out-degree distribution information, determining second expectation information used for representing a mathematical expectation of the plurality of second nodes satisfying the node out-degree distribution information;
acquiring a plurality of sixth intermediate embedding features from the embedding features of the plurality of second nodes, the plurality of sixth intermediate embedding features being used for representing features of the plurality of second nodes as the receivers; and
based on the N fourth intermediate embedding features, the plurality of fifth intermediate embedding features, the second expectation information, and the plurality of sixth intermediate embedding features, determining the second function.

5. The method according to claim 1, wherein the determining fourth embedding features of the N nodes comprises:
based on the first embedding features of the N nodes and the second embedding features of the plurality of first neighborhood nodes, determining first probability information used for indicating a probability of determining the plurality of first neighborhood nodes based on the N nodes;
based on the first embedding features of the N nodes and the third embedding features of the plurality of second neighborhood nodes, determining second probability information used for indicating a probability of determining the plurality of second neighborhood nodes based on the N nodes;
based on the first probability information and the second probability information, determining a second objective function; and
optimizing the second objective function to obtain the fourth embedding features of the N nodes.

6. The method according to claim 5, wherein the determining first probability information comprises:
acquiring N first intermediate embedding features from the first embedding features of the N nodes, the N first intermediate embedding features being used for representing features of the N nodes as the receivers;
acquiring a plurality of second intermediate embedding features from the second embedding features of the plurality of first neighborhood nodes, the plurality of second intermediate embedding features being used for representing features of the plurality of first neighborhood nodes as the initiators;
acquiring M seventh intermediate embedding features of the M nodes, the M seventh intermediate embedding features being used for representing features of the M nodes as the initiators; and
based on the N first intermediate embedding features, the plurality of second intermediate embedding features, and the M seventh intermediate embedding features, determining the first probability information.

7. The method according to claim 5, wherein the determining second probability information comprises:
acquiring N fourth intermediate embedding features from the first embedding features of the N nodes, the N fourth intermediate embedding features being used for representing features of the N nodes as the initiators;
acquiring a plurality of fifth intermediate embedding features from the third embedding features of the plurality of second neighborhood nodes, the plurality of fifth intermediate embedding features being used for representing features of the plurality of second neighborhood nodes as the receivers;

acquiring M eighth intermediate embedding features of the M nodes, the M eighth intermediate embedding features being used for representing features of the M nodes as the receivers; and based on the N fourth intermediate embedding features, the plurality of fifth intermediate embedding features, and the M eighth intermediate embedding features, determining the second probability information.

8. The method according to claim 1, further comprising:
partitioning the target graph into at least one graph partition;
storing, for a graph partition, nodes in the graph partition into a parameter server;
storing an edge table corresponding to the graph partition into an actuator corresponding to the graph partition;
sampling, for an actuator, the target graph based on the edge table stored in the actuator to obtain a plurality of sampled edges, nodes connected by the plurality of sampled edges being the N nodes,
wherein the acquiring N nodes from the M nodes further comprises:
determining, based on the plurality of sampled edges, N node identifiers; and
acquiring the N nodes corresponding to the N node identifiers from the parameter server.

9. The method according to claim 8, wherein the determining fourth embedding features of the N nodes comprises:
based on the first embedding features of the N nodes, the second embedding features of the plurality of first neighborhood nodes, and the third embedding features of the plurality of second neighborhood nodes, determining N feature gradients of the N nodes; and
uploading the N feature gradients to the parameter server, and determining, by the parameter server, the fourth embedding features of the N nodes based on the first embedding features and the N feature gradients of the N nodes.

10. A computer device comprising:
a memory used for storing at least one computer program containing executable computer instructions; and
at least one processor executing the computer program to perform:
based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and
based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers, wherein a $z^{th}$ iteration, z being a positive integer, of the multiple iterations comprises:
acquiring N nodes from the M nodes, N being a positive integer equal to or less than M;
based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and
based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

11. The computer device according to claim 10, wherein the determining fourth embedding features of the N nodes comprises:
based on the first embedding features of the N nodes, the second embedding features of the plurality of first neighborhood nodes, node in-degree distribution information, and fifth embedding features of a plurality of first nodes, determining a first function, the node in-degree distribution information being used for representing a node in-degree distribution of the N nodes, the plurality of first nodes being obtained based on a negative sampling on first neighborhoods of the N nodes, the first neighborhoods comprising the plurality of first neighborhood nodes, and the first embedding features of the N nodes, the second embedding features of the plurality of first neighborhood nodes, and the third embedding features of the plurality of second neighborhood nodes being obtained by performing a $(z-1)^{th}$ iteration;
based on the first embedding features of the N nodes, the third embedding features of the plurality of second neighborhood nodes, node out-degree distribution information, and sixth embedding features of a plurality of second nodes, determining a second function, the node out-degree distribution information being used for representing a node out-degree distribution of the N nodes, the plurality of second nodes being obtained based on a negative sampling on second neighborhoods of the N nodes, the second neighborhood comprising the plurality of second neighborhood nodes; and
optimizing a first objective function formed by the first function and the second function, to obtain the fourth embedding features of the N nodes.

12. The computer device according to claim 11, wherein the determining a first function comprises:
acquiring N first intermediate embedding features from the first embedding features of the N nodes, the N first intermediate embedding features being used for representing features of the N nodes as the receivers;
acquiring a plurality of second intermediate embedding features from the second embedding features of the plurality of first neighborhood nodes, the plurality of second intermediate embedding features being used for representing features of the plurality of first neighborhood nodes as the initiators;
based on the node in-degree distribution information, determining first expectation information used for representing a mathematical expectation of the plurality of first nodes satisfying the node in-degree distribution information;
acquiring a plurality of third intermediate embedding features from the fifth embedding features of the plurality of first nodes, the plurality of third intermediate embedding features being used for representing features of the plurality of first nodes as the initiators; and based on the N first intermediate embedding features, the plurality of second intermediate embedding features, the first expectation information, and the plurality of third intermediate embedding features, determining the first function.

13. The computer device according to claim 11, wherein the determining a second function comprises:

acquiring N fourth intermediate embedding features from the first embedding features of the N nodes, the N fourth intermediate embedding features being used for representing features of the N nodes as the initiators;

acquiring a plurality of fifth intermediate embedding features from the third embedding features of the plurality of second neighborhood nodes, the plurality of fifth intermediate embedding features being used for representing features of the plurality of second neighborhood nodes as the receivers;

based on the node out-degree distribution information, determining second expectation information used for representing a mathematical expectation of the plurality of second nodes satisfying the node out-degree distribution information;

acquiring a plurality of sixth intermediate embedding features from the embedding features of the plurality of second nodes, the plurality of sixth intermediate embedding features being used for representing features of the plurality of second nodes as the receivers; and based on the N fourth intermediate embedding features, the plurality of fifth intermediate embedding features, the second expectation information, and the plurality of sixth intermediate embedding features, determining the second function.

14. The computer device according to claim 10, wherein the determining fourth embedding features of the N nodes comprises:

based on the first embedding features of the N nodes and the second embedding features of the plurality of first neighborhood nodes, determining, first probability information used for indicating a probability of determining the plurality of first neighborhood nodes based on the N nodes;

based on the first embedding features of the N nodes and the third embedding features of the plurality of second neighborhood nodes, determining second probability information used for indicating a probability of determining the plurality of second neighborhood nodes based on the N nodes;

based on the first probability information and the second probability information, determining a second objective function; and optimizing the second objective function to obtain the fourth embedding features of the N nodes.

15. The computer device according to claim 14, wherein the determining first probability information comprises:

acquiring N first intermediate embedding features from the first embedding features of the N nodes, the N first intermediate embedding features being used for representing features of the N nodes as the receivers;

acquiring a plurality of second intermediate embedding features from the second embedding features of the plurality of first neighborhood nodes, the plurality of second intermediate embedding features being used for representing features of the plurality of first neighborhood nodes as the initiators;

acquiring M seventh intermediate embedding features of the M nodes, the M seventh intermediate embedding features being used for representing features of the M nodes as the initiators; and based on the N first intermediate embedding features, the plurality of second intermediate embedding features, and the M seventh intermediate embedding features, determining the first probability information.

16. A non-transitory computer-readable storage medium storing computer program instructions executable by at least one processor to perform:

based on object data, acquiring a target graph having M nodes for representing M objects, M being a positive integer greater than 1, and oriented edges for representing presence of traffic relationships between objects corresponding to connected nodes, wherein pointing nodes of the oriented edges are initiators of the traffic relationships, and pointed nodes of the oriented edges are receivers of the traffic relationships; and based on the M nodes and oriented edges between the M nodes, performing multiple iterations to obtain initiation embedding features and reception embedding features corresponding to the M nodes, the initiation embedding features being used for representing features of the initiators, and the reception embedding features being used for representing features of the receivers, wherein a $z^{th}$ iteration, z being a positive integer, of the multiple iterations comprises:

acquiring N nodes from the M nodes, N being a positive integer equal to or less than M;

based on oriented edges associated with the N nodes, determining a plurality of first neighborhood nodes associated with the N nodes and a plurality of second neighborhood nodes associated with the N nodes, the oriented edges pointing from the first neighborhood nodes pointing to the N nodes, and the oriented edges pointing from the N nodes pointing to the plurality of second neighborhood nodes; and based on first embedding features of the N nodes, second embedding features of the plurality of first neighborhood nodes, and third embedding features of the plurality of second neighborhood nodes, determining fourth embedding features of the N nodes, the fourth embedding features of the N nodes representing the updated initiation embedding features and reception embedding features of the N nodes after the $z^{th}$ iteration.

17. The non-transitory computer-readable storage medium according to claim 16, wherein the determining fourth embedding features of the N nodes comprises:

based on the first embedding features of the N nodes, the second embedding features of the plurality of first neighborhood nodes, node in-degree distribution information, and fifth embedding features of a plurality of first nodes, determining a first function, the node in-degree distribution information being used for representing a node in-degree distribution of the N nodes, the plurality of first nodes being obtained based on a negative sampling on first neighborhoods of the N nodes, the first neighborhoods comprising the plurality of first neighborhood nodes, and the first embedding features of the N nodes, the second embedding features of the plurality of first neighborhood nodes, and the third embedding features of the plurality of second neighborhood nodes being obtained by performing a $(z-1)^{th}$ iteration;

based on the first embedding features of the N nodes, the third embedding features of the plurality of second neighborhood nodes, node out-degree distribution information, and sixth embedding features of a plurality of second nodes, determining a second function, the node out-degree distribution information being used for representing a node out-degree distribution of the N nodes, the plurality of second nodes being obtained based on a negative sampling on second neighborhoods of the N nodes, the second neighborhood comprising the plurality of second neighborhood nodes; and optimizing a first objective function formed by the first function and the second function, to obtain the fourth embedding features of the N nodes.

18. The non-transitory computer-readable storage medium according to claim 17, wherein the determining a first function comprises:

acquiring N first intermediate embedding features from the first embedding features of the N nodes, the N first intermediate embedding features being used for representing features of the N nodes as the receivers;

acquiring a plurality of second intermediate embedding features from the second embedding features of the plurality of first neighborhood nodes, the plurality of second intermediate embedding features being used for representing features of the plurality of first neighborhood nodes as the initiators;

based on the node in-degree distribution information, determining first expectation information used for representing a mathematical expectation of the plurality of first nodes satisfying the node in-degree distribution information;

acquiring a plurality of third intermediate embedding features from the fifth embedding features of the plurality of first nodes, the plurality of third intermediate embedding features being used for representing features of the plurality of first nodes as the initiators; and based on the N first intermediate embedding features, the plurality of second intermediate embedding features, the first expectation information, and the plurality of third intermediate embedding features, determining the first function.

19. The non-transitory computer-readable storage medium according to claim 17, wherein the determining a second function comprises:

acquiring N fourth intermediate embedding features from the first embedding features of the N nodes, the N fourth intermediate embedding features being used for representing features of the N nodes as the initiators;

acquiring a plurality of fifth intermediate embedding features from the third embedding features of the plurality of second neighborhood nodes, the plurality of fifth intermediate embedding features being used for representing features of the plurality of second neighborhood nodes as the receivers;

based on the node out-degree distribution information, determining second expectation information used for representing a mathematical expectation of the plurality of second nodes satisfying the node out-degree distribution information;

acquiring a plurality of sixth intermediate embedding features from the embedding features of the plurality of second nodes, the plurality of sixth intermediate embedding features being used for representing features of the plurality of second nodes as the receivers; and based on the N fourth intermediate embedding features, the plurality of fifth intermediate embedding features, the second expectation information, and the plurality of sixth intermediate embedding features, determining the second function.

20. The non-transitory computer-readable storage medium according to claim 16, wherein the determining fourth embedding features of the N nodes comprises:

based on the first embedding features of the N nodes and the second embedding features of the plurality of first neighborhood nodes, determining, first probability information used for indicating a probability of determining the plurality of first neighborhood nodes based on the N nodes;

based on the first embedding features of the N nodes and the third embedding features of the plurality of second neighborhood nodes, determining second probability information used for indicating a probability of determining the plurality of second neighborhood nodes based on the N nodes;

based on the first probability information and the second probability information, determining a second objective function; and optimizing the second objective function to obtain the fourth embedding features of the N nodes.

* * * * *